United States Patent
Kusumi et al.

(10) Patent No.: US 10,341,114 B2
(45) Date of Patent: Jul. 2, 2019

(54) PROVIDING DEVICE, TERMINAL DEVICE, PROVIDING METHOD, NON-TRANSITORY COMPUTER READABLE STORAGE MEDIUM, AND AUTHENTICATION PROCESSING SYSTEM

(71) Applicant: YAHOO JAPAN CORPORATION, Tokyo (JP)

(72) Inventors: Takashi Kusumi, Tokyo (JP); Hidehito Gomi, Tokyo (JP); Hiroshi Ueno, Tokyo (JP); Shuji Yamaguchi, Tokyo (JP); Yusuke Kondo, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 229 days.

(21) Appl. No.: 15/225,427

(22) Filed: Aug. 1, 2016

(65) Prior Publication Data

US 2017/0078100 A1    Mar. 16, 2017

(30) Foreign Application Priority Data

Sep. 11, 2015  (JP) .................................. 2015-179476

(51) Int. Cl.
*H04L 9/32* (2006.01)
*H04L 29/06* (2006.01)

(52) U.S. Cl.
CPC ........ *H04L 9/3247* (2013.01); *H04L 63/0861* (2013.01); *H04L 63/0876* (2013.01);
(Continued)

(58) Field of Classification Search
CPC ........................... H04L 9/3247; H04L 63/0876
(Continued)

(56) References Cited

U.S. PATENT DOCUMENTS 8,627,422 B2    1/2014  Hawkes et al.
2009/0298478 A1  12/2009  Tyhurst et al.
(Continued)

FOREIGN PATENT DOCUMENTS

JP    2003-132023 A    5/2003
JP    2004-178408 A    6/2004
(Continued)

OTHER PUBLICATIONS

Jul. 26, 2016 Office Action issued in Japanese Patent Application No. 2015-179476.
(Continued)

*Primary Examiner* — Brandon S Hoffman
*Assistant Examiner* — Nega Woldemariam
(74) *Attorney, Agent, or Firm* — Oliff PLC

(57) ABSTRACT

A providing device according to the present application includes a detecting unit and a providing unit. The detecting unit detects a function, from among functions used for communication with an authentication server that authenticates the identity of a user by verifying a signature of authentication result information that is information created by adding the signature using a predetermined key to an authentication result obtained by an authentication device that performs personal authentication on the user and that is information processed by a specific authentication procedure, that is not held by a terminal device that is used by the user. The providing unit provides the function detected by the detecting unit to the terminal device that is used by the user.

12 Claims, 13 Drawing Sheets

(52) U.S. Cl.
CPC ........ *H04L 63/205* (2013.01); *H04L 2209/76* (2013.01); *H04L 2463/082* (2013.01)

(58) Field of Classification Search
USPC .......................................................... 713/176
See application file for complete search history.

(56) References Cited

U.S. PATENT DOCUMENTS

| | | |
|---|---|---|
| 2010/0269153 A1 | 10/2010 | Kato et al. |
| 2011/0047373 A1* | 2/2011 | Karasawa ............... G06F 21/33 713/156 |
| 2013/0262857 A1* | 10/2013 | Neuman ................. H04L 63/08 713/155 |
| 2013/0311382 A1 | 11/2013 | Fosmark et al. |
| 2014/0183269 A1 | 7/2014 | Glaser |
| 2014/0289820 A1 | 9/2014 | Lindemann et al. |
| 2014/0289833 A1 | 9/2014 | Briceno et al. |
| 2015/0033305 A1 | 1/2015 | Shear et al. |
| 2015/0113292 A1 | 4/2015 | Spalka |
| 2015/0222604 A1 | 8/2015 | Ylonen |
| 2015/0350168 A1 | 12/2015 | Hayton |
| 2016/0087957 A1 | 3/2016 | Shah et al. |
| 2016/0364659 A1 | 12/2016 | Bergdale et al. |

FOREIGN PATENT DOCUMENTS

| | | | |
|---|---|---|---|
| JP | 2004-362061 A | 12/2004 | |
| JP | 2005-505194 A | 2/2005 | |
| JP | 2005-258687 A | 9/2005 | |
| JP | 2006-260201 A | 9/2006 | |
| JP | 2011-059749 A | 3/2011 | |
| JP | 2011-227843 A | 11/2011 | |
| JP | 2012-073902 A | 4/2012 | |
| JP | 2012-103784 A | 5/2012 | |
| JP | 2013-204233 A | 10/2013 | |
| JP | 2014-056550 A | 3/2014 | |
| JP | 2014-178845 A | 9/2014 | |
| JP | 2014-191686 A | 10/2014 | |
| JP | 5604016 B1 | 10/2014 | |
| JP | 2014-211678 A | 11/2014 | |
| JP | 2015-138978 A | 7/2015 | |
| JP | 2015232369 A | 12/2015 | |
| WO | 03/30445 A1 | 4/2003 | |

OTHER PUBLICATIONS

Nov. 15, 2016 Office Action issued in Japanese Patent Application No. 2015-179476.
Aug. 1, 2017 Office Action issued in Japanese Patent Application No. 2017-012396.
Feb. 9, 2016 Office Action issued in Japanese Patent Application No. 2015-175486.
Jul. 14, 2016 Office Action issued in Japanese Patent Application No. 2015-232369.
Nov. 8, 2016 Office Action issued in Japanese Patent Application No. 2015-232369.
May 10, 2018 Office Action Issued in U.S. Appl. No. 15/263,855.
Apr. 10, 2018 Office Action Issued in U.S. Appl. No. 15/226,379.
U.S. Appl. No. 15/226,379, filed Aug. 2, 2016 in the name of Gomi et al.
U.S. Appl. No. 15/263,855, filed Sep. 13, 2016 in the name of Gomi et al.
Nov. 7, 2018 Office Action issued in U.S. Appl. No. 15/263,855.

* cited by examiner

FIG.7

| TERMINAL ID | CREATION MEANS | AUTHENTI-CATION DEVICE ID | REGISTRATION DESTINATION | TYPE | REGISTRA-TION DATA | AUTHENTI-CATION USER | RELIABILITY | PRIVATE KEY | ... |
|---|---|---|---|---|---|---|---|---|---|
| ... | ... | ... | ... | ... | ... | ... | ... | ... | ... |
| 10 | 0 | A11 | INSIDE | FINGERPRINT | B11 | U01 | 3 | - | ... |
|  |  | A40 | SHOP TERMINAL 40 | PIN | B12 | U01 | 5 | K121 | ... |
|  |  | A45 | CLOUD SERVER 45 | FINGERPRINT | B13 | U01 | 2 | K131 | ... |
| ... | ... | ... | ... | ... | ... | ... | ... | ... | ... |
| 30 | 1 | A31 | INSIDE | IRIS | B31 | U01 | 4 | K311 | ... |
|  |  | A32 | INSIDE | VOICEPRINTS | B32 | U01 | 3 | K321 | ... |
|  |  | A45 | CLOUD SERVER 45 | FINGERPRINT | B33 | U01 | 2 | K331 | ... |
| ... | ... | ... | ... | ... | ... | ... | ... | ... | ... |
| 35 | 1 | A35 | INSIDE | FINGERPRINT | B35 | U02 | 3 | K351 | ... |
| ... | ... | ... | ... | ... | ... | ... | ... | ... | ... |

| USER ID | OWNED TERMINAL ID | CREATION MEANS | LINE PROVIDING COMPANY | RELIABLE USER | SERVICE ID | AUTHENTICAION HISTORY INFORMATION |
|---|---|---|---|---|---|---|
| ... | ... | ... | ... | ... | ... | ... |
| U01 | 10 | 0 | C01 | | | |
| | 30 | 1 | C01 | U02 | Y01 | R01 |
| ... | ... | ... | ... | | | |
| U02 | 35 | 1 | C01 | | | |
| | 60 | 0 | C03 | U01 | Y02 | R02 |
| ... | ... | ... | ... | ... | ... | ... |

FIG.10

| COMMUNICATION DESTINATION INFORMATION | AUTHENTICATION DEVICE ID | TYPE | REGISTRATION DATA | AUTHENTICATION USER | RELIABILITY | PUBLIC KEY |
|---|---|---|---|---|---|---|
| ... | ... | ... | ... | ... | ... | ... |
| PROXY TERMINAL 30 | A31 | IRIS | B31 | U01 | 4 | K312 |
| | A32 | VOICEPRINTS | B32 | U01 | 3 | K322 |
| | ... | ... | ... | ... | ... | ... |
| FRIEND TERMINAL 35 | A35 | FINGERPRINT | B35 | U02 | 3 | K352 |
| | A36 | PHYSICAL KEY | B36 | U02 | 2 | K362 |
| | ... | ... | ... | ... | ... | ... |
| SHOP TERMINAL 40 | A40 | PIN | B12 | U01 | 5 | K122 |
| | | | B21 | U02 | 5 | K212 |
| CLOUD SERVER 45 | A45 | FINGERPRINT | B13 | U01 | 2 | K132 |
| | | | B33 | U01 | 2 | K332 |
| ... | ... | ... | ... | ... | ... | ... |

121

PROVIDING DEVICE, TERMINAL DEVICE, PROVIDING METHOD, NON-TRANSITORY COMPUTER READABLE STORAGE MEDIUM, AND AUTHENTICATION PROCESSING SYSTEM

CROSS-REFERENCE TO RELATED APPLICATION(S)

The present application claims priority to and incorporates by reference the entire contents of Japanese Patent Application No. 2015-179476 filed in Japan on Sep. 11, 2015.

BACKGROUND OF THE INVENTION

1. Field of the Invention

The present invention relates to a providing device, a terminal device, a providing method, a non-transitory computer readable storage medium having stored therein a providing program, and an authentication processing system.

2. Description of the Related Art

In recent years, with the popularization of communication networks, services via networks are actively provided. A user logs in a service provided via a network by using a communication terminal device and uses the service. When a service is used via a network, it is desirable to certainly perform personal authentication on a user who uses the service.

As a technology for the personal authentication, there is a known technology that provides personal authentication in accordance with the user's wishes or the policy of a server with respect to biometrics with various system configurations (for example, Japanese Laid-open Patent Publication No. 2004-362061). Furthermore, there is a known technology that distinguishes a network environment of a user and that performs appropriate user authentication in accordance with a network environment (for example, Japanese Laid-open Patent Publication No. 2012-103784). Furthermore, there is a known technology that implements a predetermined authentication function via an interface by an authentication apparatus using an extensible authentication protocol interface (for example, Japanese National Publication of International Patent Application No. 2005-505194).

However, in the conventional technologies, it is difficult to flexibly respond to an authentication request. For example, regarding a personal authentication means via a network, from the viewpoint of ensuring the security or convenience, the function or the technology needed for authentication may sometimes be changed. In this case, because, for the terminal side that requests personal authentication, various functions and technologies are requested by the authentication server side; therefore, it is difficult to flexibly respond to the requests to meet the demands.

SUMMARY OF THE INVENTION

It is an object of the present invention to at least partially solve the problems in the conventional technology.

A providing device according to the present application includes a detecting unit that detects a function, from among functions used for communication with an authentication server that authenticates the identity of a user by verifying a signature of authentication result information that is information created by adding the signature using a predetermined key to an authentication result obtained by an authentication device that performs personal authentication on the user and that is information processed by a specific authentication procedure, that is not held by a terminal device that is used by the user, and a providing unit that provides the function detected by the detecting unit to the terminal device that is used by the user.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a schematic diagram illustrating an example of a terminal information storage unit according to the embodiment;

FIG. 8 is a schematic diagram illustrating an example of a user information storage unit according to the embodiment;

FIG. 10 is a schematic diagram illustrating an example of a registration information storage unit according to the embodiment;

DETAILED DESCRIPTION OF THE PREFERRED EMBODIMENTS

Figure 1:
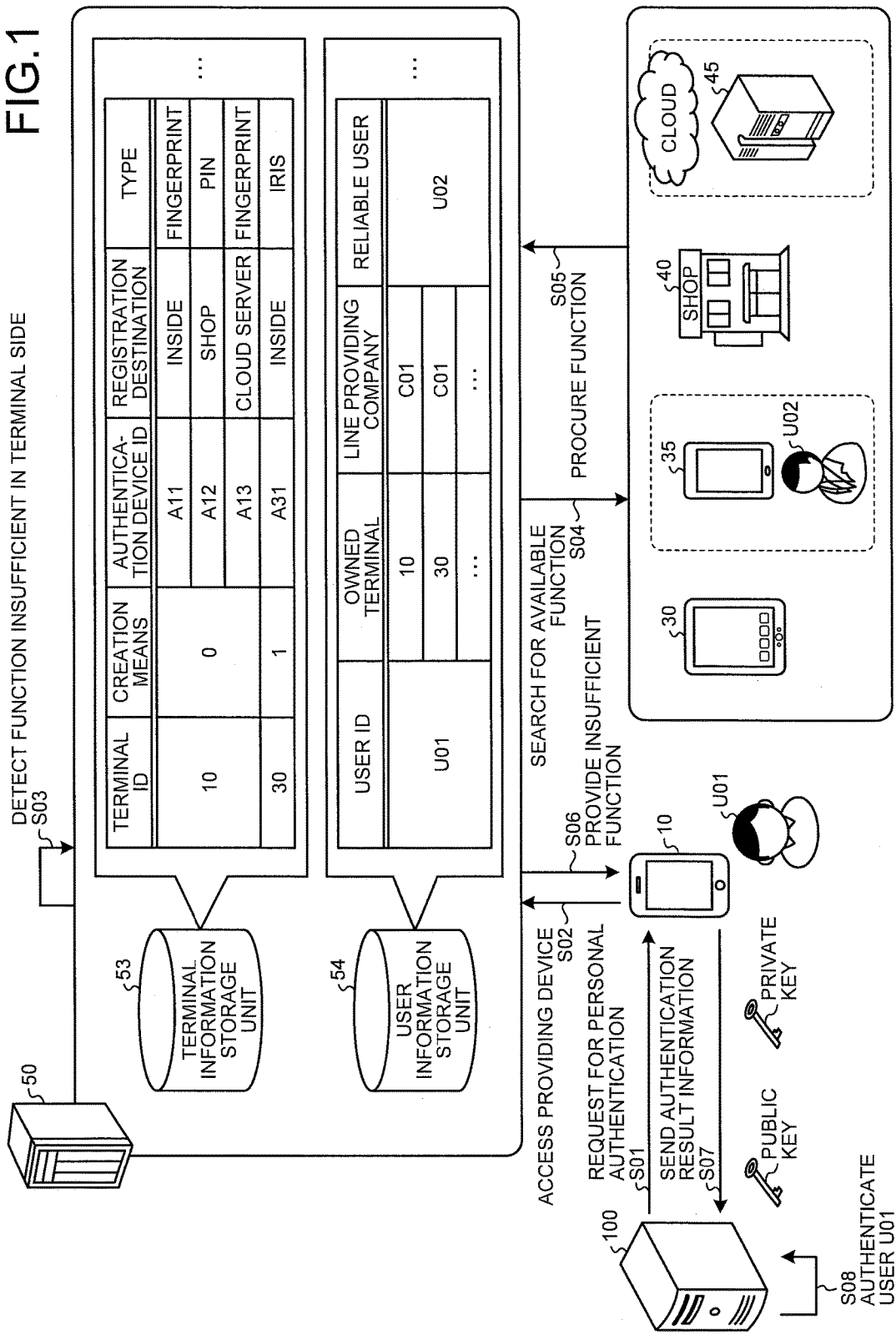
FIG. 1 is a schematic diagram illustrating an example of a providing process according to an embodiment.

A mode (hereinafter, referred to as an "embodiment") for carrying out a providing device, a terminal device, a providing method, a non-transitory computer readable storage medium having stored a providing program, and an authentication processing system according to the present invention will be described in detail below with reference to the accompanying drawings. The providing device, the terminal device, the providing method, the non-transitory computer readable storage medium having stored the providing program, and the authentication processing system according to the present invention are not limited by the embodiment. Furthermore, each of the embodiments described above can be appropriately used in combination as long as the content of processes does not conflict with each other. Furthermore, in the embodiments below, the same components are denoted by the same reference numerals and an overlapping description will be omitted.

1. Example of a Providing Process

First, an example of a providing process according to the embodiment will be described with reference to FIG. 1. FIG. 1 is a schematic diagram illustrating an example of a providing process according to an embodiment. FIG. 1 indicates an example in which a providing device 50 according to the present invention provides, to a user terminal 10 that performs the predetermined communication with an authentication server 100, a function that is insufficient in the user terminal 10 from among the functions that are used in predetermined communication.

In the example illustrated in FIG. 1, the user terminal 10 is an information processing terminal that is used by a user U01. The user U01 uses, by using the user terminal 10, a service provided via a network, for example, a service provided from a web server. In a description below, the user terminal 10 may sometimes be referred to as the user U01. Namely, in a description below, the user U01 can also be read as the user terminal 10.

The authentication server 100 is a server device that acquires information sent from the user terminal 10 and that performs personal authentication on the user U01 on the basis of the acquired information. The authentication server 100 authenticates, on the basis of the acquired information, that the user U01 is the person in question and creates information that indicates the user U01 has been authenticated. The information that indicates the user U01 has been authenticated is sent from the authentication server 100 to the various kinds of services side (a web server, etc.), whereby the user terminal 10 can use services that need personal authentication, such as a login to various kinds of services, a use of the service ID issued for each service, a settlement performed via a network, or the like.

In a series of communication occurring between the user terminal 10 and the authentication server 100, when the user terminal 10 side receives personal authentication from the authentication server 100 side, the providing device 50 is an information processing apparatus that provides an insufficient function. The authentication server 100 requests, in an authentication process, the user terminal 10 to receive a predetermined processing function in order to ensure the security of personal authentication and convenience. However, the user terminal 10 side that receives authentication does not always have the function requested by the authentication server 100 side. Thus, the providing device 50 accepts information related to the function that is currently held by the user terminal 10 and detects the function insufficient for the communication with the authentication server 100 side. Then, in order to establish the communication that is used for the user terminal 10 side to receive authentication from the authentication server 100 side, for example, the providing device 50 procures a function from another device that can cooperate with the user terminal 10 and provides the procured function to the user terminal 10 side.

Authentication Method of the Authentication Server 100

Figure 2:
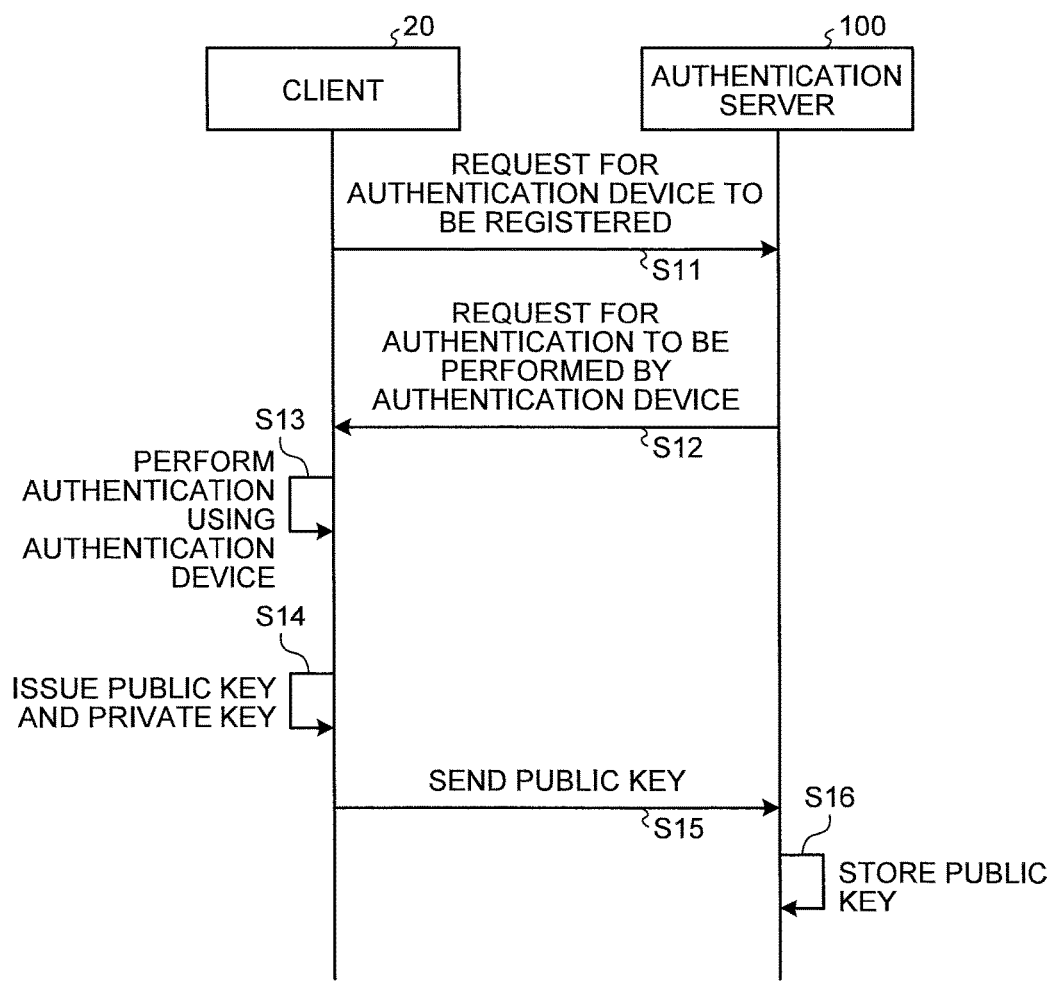
FIG. 2 is a sequence diagram (1) illustrating an authentication method according to the embodiment.
Figure 3:
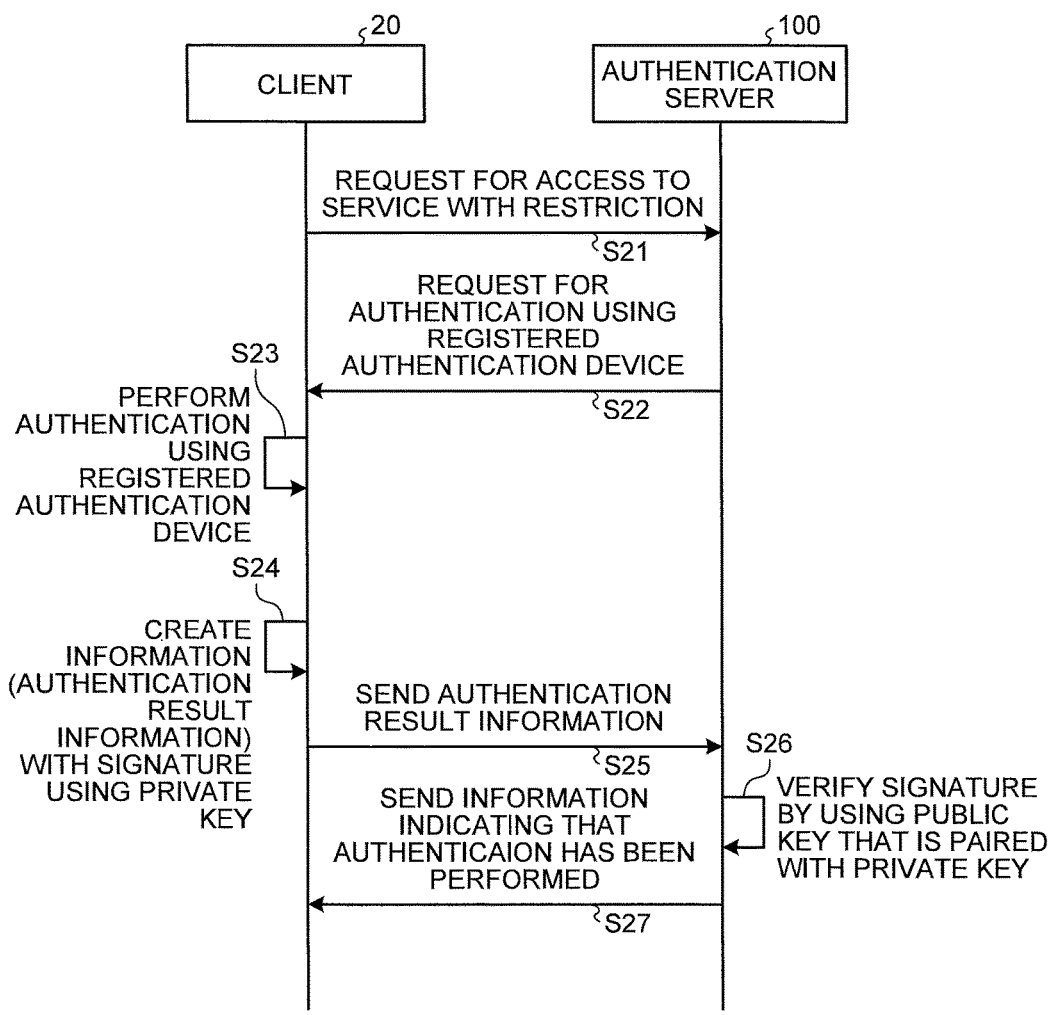
FIG. 3 is a sequence diagram (2) illustrating an authentication method according to the embodiment.

In the following, before a description of the providing process performed by the providing device 50, a method in which the authentication server 100 performs personal authentication on a user who uses a predetermined information processing terminal (hereinafter, referred to as a "client 20" in order to distinguish the information processing terminal from the user terminal 10) will be described with reference to FIGS. 2 and 3. Furthermore, it is assumed that the client 20 is a terminal that satisfies the function requested by the authentication server 100 side in communication related to the authentication process performed by the authentication server 100.

It is assumed that the authentication server 100 uses, in authentication of the client 20, an authentication method, which is based on the so-called public key cryptosystem, that guarantees certainty of information by checking a previously issued public key against a private key is used. Namely, the authentication server 100 performs authentication on the basis of a pair of the public key and the private key issued with respect to each of the authentication devices held by the client 20. The authentication device indicates a device that has a function that allows the client 20 to perform personal authentication in the local. The authentication performed in a local mentioned here indicates authentication that is performed in a state that does not need a wide area network (external network), such as the Internet or the like, and is, for example, authentication that is performed by using the function provided inside the client 20. The authentication device previously accepts information, such as biometric information on each of users, or the like, that can authenticate each of the users themselves. Then, the authentication device accepts, in a case of authentication, an input of biometric information or the like from a user and performs personal authentication on the basis of the check result between registration data and the input data. Specifically, the authentication device includes a fingerprint authentication device, an iris authentication device, a voice print authentication device, or the like. Furthermore, the authentication device may also be implemented by software installed in the client 20 or may also implemented by hardware that is present within the region connected to the client 20 by a local area network (LAN). Namely, the authentication device also includes hardware or the like that does not use an external network, such as the Internet or the like, for example, hardware or the like that cooperates with the client 20 because the hardware directly being connected to an interface provided in the client 20.

First, the procedure in which the authentication server 100 registers the client 20 as the authentication target will be described. FIG. 2 is a sequence diagram (1) illustrating an authentication method according to the embodiment. FIG. 2 indicates the flow of a process in which, the authentication server 100 performs, before an authentication process, registration related to the client 20 that is authenticated by the authentication server 100.

The client 20 accesses the authentication server 100 and requests for registration of the authentication device (Step S11). The authentication server 100 responds to the request sent from the client 20 and requests for authentication to be performed by the authentication device (Step S12).

The user who uses the client 20 operates the authentication device that is requested to be registered in the authentication server 100 and then performs, in the local, authentication that is performed by the authentication device (Step S13). For example, if the user selects a fingerprint authentication device as the authentication device that is used for the authentication, the user performs the authentication process by holding a finger over a place in which authentication is performed. By checking the registration data in the authentication device against the input data, if the authentication device on the client 20 side can confirm that the user is a normal user, the authentication device issues a public key and a private key associated with the subject authentication process (Step S14). Then, the client 20 stores the issued private key in the client 20 and sends the public key that is paired with the private key to the authentication server 100 (Step S15). The authentication server 100 receives the public key from the client 20, associates the received public key with the subject authentication device, and stores the associated public key (Step S16). It is assumed that the private key stored in the client 20 is basically stored in an area that does not accept an access and it is assumed that an access is not permitted as long as authentication performed in the local by the authentication device that has accepted the registration is successful. Consequently, regarding the authentication device provided in the client 20, registration in the authentication server 100 has been completed.

Then, FIG. 3 will be described. FIG. 3 is a sequence diagram (2) illustrating an authentication method according to the embodiment. FIG. 3 indicates the flow of a process performed in a case of actually requesting personal authentication from the authentication server 100, such as a case in which, for example, the client 20 uses a service.

The user requests the authentication server 100 to access a service with a predetermined restricted access (Step S21). Such a request is sometimes sent via, for example, a web server or the like that provides a service via a network. Namely, in the course of using the service, the user sometimes receives a request for personal authentication from the web server placed at the connection destination. In this case, if the user declares to perform personal authentication, the subject information is sent to the authentication server 100 from the client 20 or the web server at the connection destination.

The authentication server 100 that has accepted the request requests the client 20 to perform authentication by using the previously registered authentication device (Step S22). The user of the client 20 that has accepted the request performs local authentication by using the previously registered authentication device (Step S23).

If the authentication performed by the authentication device has been successful, i.e., if personal authentication has been confirmed in the local, the user can access the private key stored in the client 20. Then, by using the private key that can only be accessed by the user who is recognized as a normal user by the authentication device, the client 20 creates a signature (hash value) with respect to the information related to the result of the authentication. In other words, the client 20 creates information with the signature using the previously issued private key (Step S24). The information created in this way is referred to as "authentication result information".

Then, the client 20 uses a specific communication procedure prescribed with the authentication server 100, sends the created authentication result information (Step S25), and allows the authentication server 100 to process the authentication result information. The authentication server 100 verifies, by using the public key paired with the private key, the sent authentication result information (Step S26). Namely, the authentication server 100 verifies that no falsification is present in the authentication result information, in other words, verifies whether authentication result information is created by an appropriate private key. In this way, the authentication server 100 confirms that the authentication device targeted for authentication holds an appropriate private key. If this state has been confirmed, the authentication server 100 authenticates, on the basis of the authentication result information, that the user who uses the client 20 is a normal user. Then, the authentication server 100 indicates that the authentication server 100 itself authenticates the state and sends, to the client 20, information that indicates that authentication has been performed and that includes information on the requested service to be accessed at Step S21 (Step S27). The information that indicates that authentication has been performed is, for example, an authentication cookie.

As described above, according to the authentication method described above, the client 20 does not send, to the network, the information itself, such as passwords, service IDs, or the like that are often used for general authentication, that is used for authentication. Namely, the information sent from the client 20 is merely information indicating the authentication result in the local and, even if a third party intercepts the information sent from the client 20, the third party is not able to use the intercepted information. Consequently, it can be said that the authentication method that is used by the authentication server 100 is a high-security method. Furthermore, according to the authentication method that is used by the authentication server 100, because a user does not need to store a password, it is possible to reduce the load applied to the user.

Furthermore, as described above, the authentication server 100 uses, in the process of the authentication result information sent from the client 20, a specific communication procedure prescribed with the client 20. The communication procedure is the authentication procedure prescribed between the authentication server 100 and the client 20 and can be read as the protocol related to communication. For example, the authentication server 100 uses the protocol, such as the universal authentication framework (UAF), the universal second factor (U2F), or the like. Consequently, it is possible to ensure the higher security of communication between the authentication server 100 and the client 20.

As described with reference to FIGS. 2 and 3, if communication using the authentication method based on the public key cryptosystem using a specific protocol is established between the authentication server 100 and the authentication device in the client 20, the client 20 can perform personal authentication on the authentication server 100 without sending the authentication information itself, such as a password or the like, to the network. However, in the method described above, because the user is not able to use the authentication device that is not registered in the authentication server 100 and needs to newly perform registration for each authentication device, it takes a lot of time and effort. Furthermore, if a user does not have, on the local side, an authentication device that performs personal authentication by using information with high reliability, such as biometric information or the like, the user is not able to obtain an authentication result that is used to create authentication result information to be sent to the authentication server 100 and is not able to receive authentication from the authentication server 100. Furthermore, if the client 20 side does not comply with the protocol prescribed by the authentication server 100, the user is not able to complete the authentication process performed by the authentication server 100. In this way, there is a problem in that the client 20 side that performs communication with the authentication server 100 is not able to use, depending on the provided functional configuration, various kinds of services needed for personal authentication performed by the authentication server 100.

Accordingly, the providing device 50 corresponding to the providing device according to the present embodiment cooperates with the information processing terminal (in the example illustrated in FIG. 1, the user terminal 10 corresponds to the information processing terminal) that has difficulty in receiving, by itself, an authentication process performed by the authentication server 100, whereby the providing device 50 makes it possible for the user terminal 10 to receive the authentication process performed by the authentication server 100. In the following, a description will be given here by referring back to FIG. 1 and an example of the authentication process including the providing device 50 will be described along the flow of the process. Furthermore, in the example illustrated in FIG. 1, it is assumed that the user terminal 10 previously registers, in the providing device 50, the information related to the function held by the user terminal 10 and related to the user terminal 10. Furthermore, it is assumed that the user terminal 10 is not able to create, by itself, the information associated with the specific protocol that is used for communication with the authentication server 100.

In the example illustrated in FIG. 1, the authentication server 100 requests the user terminal 10 to perform personal authentication (Step S01). For example, when the user U01 uses a predetermined web service, if the web server requests personal authentication on the user U01, the authentication server 100 requests, in response to the request from the web server, the user terminal 10 to perform the personal authentication. As described with reference to FIGS. 2 and 3, the user terminal 10 includes the authentication device that performs, on the local side, highly reliable authentication. If the user terminal 10 can create authentication result information that is processed by a specific protocol, the user terminal 10 by itself creates the authentication result information and sends the created authentication result information to the authentication server 100. However, in the example illustrated in FIG. 1, the user terminal 10 does not have the function to create, by itself, the authentication result information. Thus, in order for the user terminal 10 to receive an offer of the function associated with the insufficient function, the user terminal 10 accesses the providing device 50 (Step S02).

The providing device 50 includes a terminal information storage unit 53 that stores therein terminal information on the user terminal 10 or the like and a user information storage unit 54 that stores therein user information on the user U01 or the like. The providing device 50 refers to the information that is previously registered in the storage unit and information on the present state sent from the user terminal 10 and detects, in communication with the authentication server 100, the function insufficient on the user terminal 10 side (Step S03).

First, the providing device 50 refers to the terminal information storage unit 53 and detects "10" that is the identification information (terminal ID) on the terminal device from which an access has been accepted. Furthermore, it is assumed that the terminal ID matches the reference numeral added to each of the devices. Namely, the terminal ID "10" indicates the user terminal 10.

Subsequently, the providing device 50 refers to the terminal information storage unit 53 and detects the function held by the user terminal 10. For example, in the example illustrated in FIG. 1, the providing device 50 detects that, regarding the user terminal 10, the item of a creation means for creating authentication result information is "0", i.e., detects that the user terminal 10 does not have the creation means for creating the authentication result information. Furthermore, the providing device 50 detects that the user terminal 10 has three types of authentication devices; detects that, from among the authentication devices, an authentication device "A11" is provided inside the user terminal 10; and detects that the authentication device "A11" is the type of "fingerprint" authentication (hereinafter, the authentication device "A11" is represented by the "fingerprint authentication device A11"). Consequently, the providing device 50 detects that the user terminal 10 is a terminal that can perform personal authentication using fingerprint authentication by the user terminal 10 but is not able to create the result thereof as authentication result information.

Here, the providing device 50 refers to the user information storage unit 54 and acquires information related to the user U01 that has the user terminal 10. For example, the providing device 50 detects that, regarding the user U01 that is identified by the identification information (user ID) "U01", the user terminal 10 and another terminal "30" (referred to as a "proxy terminal 30" in order to distinguish with the user terminal 10) are registered as the possessing terminals. Furthermore, the providing device 50 detects that both the user terminal 10 and the proxy terminal 30 use the lines provided from the same line providing company and detects, via the information registered in the line providing company, that both are reliable registration information as the terminals owned by the same user. Furthermore, the providing device 50 refers to the terminal information storage unit 53 and detects that the proxy terminal 30 has the creation means for creating the authentication result information.

Namely, the providing device 50 detects that the proxy terminal 30 is a terminal having the constant reliability in the authentication process performed on the user U01 and that has a means for creating authentication result information. Then, the providing device 50 searches for, via network, the function that can be used in communication between the user terminal 10 and the authentication server 100 (Step S04). For example, the providing device 50 accesses the proxy terminal 30 and performs a search in order to determine whether the function that can be used in communication between the user terminal 10 and the authentication server 100 can be substituted by the proxy terminal 30. If the proxy terminal 30 can cover the creation means requested by the user terminal 10, the providing device 50 procures the subject function by, for example, operating the creation means in the proxy terminal 30 (Step S05). Then, the providing device 50 provides the insufficient function to the user terminal 10 (Step S06). For example, the providing device 50 establishes the connection between the user terminal 10 and the proxy terminal 30 and allows the proxy terminal 30 to send the result of the authentication performed in the fingerprint authentication device A11 from the user terminal 10 to the user terminal 10. The proxy terminal 30 creates authentication result information on the basis of the result of the authentication performed in the fingerprint authentication device A11. Then, the proxy terminal 30 sends the created authentication result information to the user terminal 10. The user terminal 10 sends the sent authentication result information to the authentication server 100 (Step S07).

The authentication server 100 uses the public key associated with the previously owned proxy terminal 30 and verifies the authentication result information created by the private key stored in the proxy terminal 30. At this time, the authentication server 100 may also separately accept, in addition to the authentication result information, the information that identifies that the creation source of the authentication result information is the proxy terminal 30. Furthermore, the authentication server 100 may also recognize that, by accepting the information related to the reliability of each of the user terminal 10 and the proxy terminal 30, creation of the authentication result information sent from the user terminal 10 is acted by, as a proxy, the proxy terminal 30. For example, it is assumed that the line providing company C01 has verified that both the user terminal 10 and the proxy terminal 30 use the lines provided from the same line providing company C01 and are held by the same user U01. In this case, the authentication server 100 may also recognize that, by accepting such reliable information from the providing device 50 or the user terminal 10 side, the proxy terminal 30 as the terminal that acts, as a proxy, for the user terminal 10.

Then, when the authentication server 100 verifies the authentication result information that is obtained from the creation process performed by the proxy terminal 30 acted as a proxy, the authentication server 100 performs authentication on the user U01 who uses the user terminal 10 (Step S08). Furthermore, if the user terminal 10 does not have the function to send the authentication result information that is processed by the specific protocol prescribed by the authentication server 100, the proxy terminal 30 may also perform, acting as a proxy, the transmission process at Step S06.

In this way, by using the registration information on the user terminal 10 and the present information on the user terminal 10, the providing device 50 detects the function insufficient for communication with the authentication server 100 and searches for an external device that has the associated function. Then, the providing device 50 procures the function held by the searched external device and provides the procured function to the user terminal 10.

Furthermore, the providing device 50 also procures the function from the device other than the proxy terminal 30. For example, as illustrated in FIG. 1, the providing device 50 has information indicating that, as a reliable user of the user U01, the user U02 is registered. In this case, the providing device 50 searches for the terminal device (referred to as a "friend terminal 35" in order to distinguish with the user terminal 10) held by the user U02. Then, the providing device 50 detects that the creation means for creating the authentication result information that is used for communication with the authentication server 100 is held by the friend terminal 35. Then, the providing device 50 procures the creation means from the friend terminal 35 and provides the procured function to the user terminal 10.

Furthermore, as another example, it is assumed that the providing device 50 detects that the fingerprint authentication device A11 provided inside the user terminal 10 is in an unused state due to some sort of trouble. In this case, the providing device 50 searches for another authentication device on the basis of the registration information on the user terminal 10. For example, the user terminal 10 registers, as the authentication device, a shop terminal 40 provided in a predetermined shop (for example, a shop operated by a line providing company C01 that provides the line used by the user terminal 10). In this case, the providing device 50 searches for, as the authentication device that acts as a proxy for the authentication function of the user terminal 10, an authentication device A12 provided in the shop terminal 40 and then procures the subject function. Then, the providing device 50 provides the procured function to the user terminal 10.

Specifically, the providing device 50 submits, to the user U01, information indicating that the authentication device A12 provided in the shop terminal 40 can be used. For example, the providing device 50 establishes communication between the user terminal 10 and the shop terminal 40 and sends predetermined information from the user terminal 10, whereby the providing device 50 submits information indicating that it is possible to perform authentication in the local. Here, it is assumed that authentication of the identity of the user U01 can be performed by the user terminal 10 sending, to the shop terminal 40, the identification number, i.e., a personal identification number (PIN), that is assigned to the user terminal 10 itself. Accordingly, the providing device 50 allows, in the communication established between the user terminal 10 and the shop terminal 40, the user terminal 10 to send the PIN. Then, the providing device 50 submits, to the user terminal 10, the result indicating personal authentication of the user U01 issued by the authentication device A12 related to the shop terminal 40.

Alternatively, the providing device 50 may also use the authentication function that is previously registered by the user U01 and that is held by a cloud server 45. For example, it is assumed that user U01 stores registration data on a fingerprint in a cloud as a backup. The providing device 50 refers to the subject registration information; searches for, as a proxy of the fingerprint authentication device A11, the authentication device A13 that uses the cloud server 45; and procures the subject function. Namely, the providing device 50 establishes the connection between the user terminal 10 and the cloud server 45. The user U01 uses the user terminal 10 (alternatively, another predetermined terminal device) and sends the fingerprint data to the cloud server 45. Then, the providing device 50 provides the authentication result issued from the cloud server 45 to the user U01. Furthermore, in the process described above, the providing device 50 may also establish communication between both the devices and mediate sending and receiving information or, alternatively, the providing device 50 may also only provide, instead of sending and receiving the information by itself, information indicating that another device can be used by the user terminal 10.

In the process described above, the providing device 50 provides, for example, on the basis of the reliability of the device that serves as the providing source of the function, the insufficient function to the user terminal 10. For example, because the shop terminal 40 is operated by a telecommunications carrier, it is conceivable that the reliability of the issued authentication result is relatively high. In contrast, regarding the cloud server 45, because there is a possibility of an unfair use due to an access by a third party, it is conceivable that the reliability of the authentication result to be issued is relatively low. In this case, the providing device 50 may also give priority to the procurement of the function from the shop terminal 40 with high reliability. Furthermore, also regarding the proxy terminal 30 and the friend terminal 35, the providing device 50 may also evaluate the value of the reliability with the user terminal 10 and provide the function such that the authentication result information created by the reliable terminal is sent to the authentication server 100.

As described above, from among the functions that are used for communication with the authentication server 100 and that are in the user terminal 10 that performs communication with the authentication server 100, the providing device 50 according to the embodiment detects a function that is not held by the user terminal 10. Then, the providing device 50 provides the function associated with the detected function to the user terminal 10 side (the user terminal 10 side includes the proxy terminal 30, the friend terminal 35, or the like that requests the authentication server 100 to perform authentication) that sends the authentication result information to the authentication server 100.

As described above, the providing device 50 can provide the function requested for communication to the user terminal 10 that is not able to establish by itself communication with the authentication server 100 that uses a predetermined authentication method. Namely, the user terminal 10 can establish communication with the authentication server 100 without changing the current status and perform the authentication process. Specifically, even when the user terminal 10 is not able to create by itself information associated with the specific protocol, the user terminal 10 allows the terminal that has a predetermined private key to perform a proxy process by cooperating with the providing device 50, whereby the user terminal 10 can create the authentication result information to be sent to the authentication server 100. Furthermore, according to the providing device 50, for example, even when the authentication method prescribed by the authentication server 100 side has been changed, the providing device 50 can procure, each time, the function needed for communication. Consequently, the user terminal 10 side that uses the providing device 50 can complete the authentication process by receiving, each time, an offer of the function complying with the subject method instead of the method prescribed by the authentication server 100. Furthermore, because the authentication server 100 side is supposed to accept the information sent from a reliable device or the like that is detected by the providing device 50, it is possible to perform the authentication process that maintains constant reliability. In this way, the providing device 50 does not impair the security of authentication and can flexibly respond to an authentication request.

Furthermore, the example illustrated in FIG. 1 indicates a case in which the user terminal 10 and the providing device 50 communicate with each other and, furthermore, the proxy terminal 30 or the like, which is the device searched for by the providing device 50, and the providing device 50 communicate with each other. However, as described above, the user terminal 10 and the proxy terminal 30 or the like may also directly communicate with each other and the user terminal 10 may also accept, from the proxy terminal 30, an offer of the function that is used for the communication with the authentication server 100. Furthermore, in the authentication process illustrated in FIG. 1, an example in which the providing device 50 provides the function insufficient, on the user terminal 10 side, for the communication in the authentication process. However, the providing device 50 does not always perform the process that provides the function insufficient, on the user terminal 10 side, for the communication with the authentication server 100. Namely, there may be a case in which the user terminal 10 can communicate with the authentication server 100 but does not have another function that is detected by the providing device 50. For example, in the example illustrated in FIG. 1, there may be a case in which, even if the user terminal 10 includes the fingerprint authentication device A11, the user U01 wants to use another authentication device (for example, an authentication device that uses the iris or voiceprints). In this way, the providing device 50 detects the function that is not held by the user terminal 10 and that is used for the communication with the authentication server 100 even if the function is not insufficient for communication with the authentication server 100. Namely, according to the providing device 50, the user U01 can flexibly cope with the procedure of specific authentication requested by the authentication server 100 and receive convenience related to the authentication process.

2. Configuration of the Authentication Processing System

Figure 4:
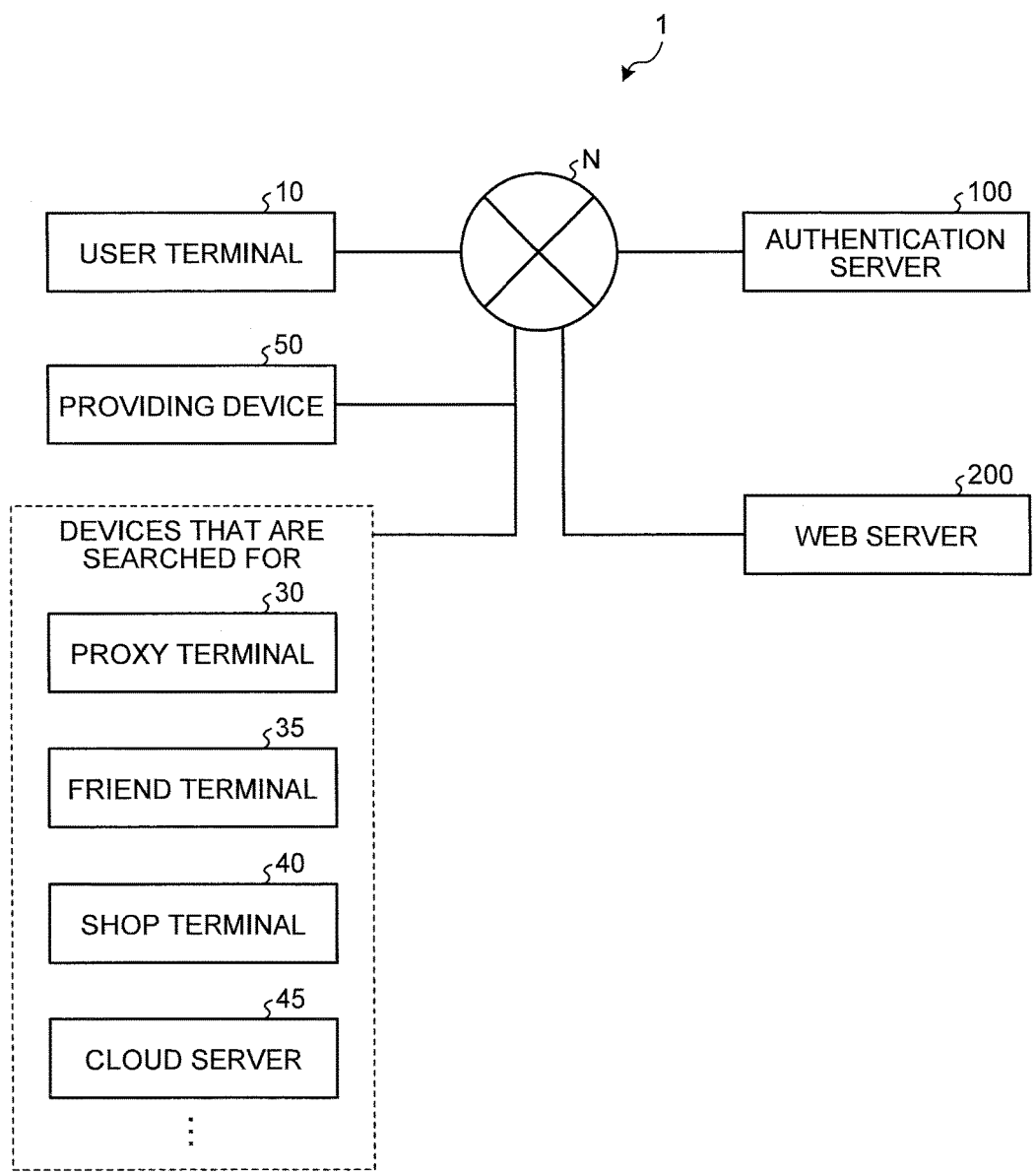
FIG. 4 is a schematic diagram illustrating a configuration example of an authentication processing system according to the embodiment.

In the following, the configuration of an authentication processing system 1 that includes therein the providing device 50 according to the embodiment will be described with reference to FIG. 4. FIG. 4 is a schematic diagram illustrating a configuration example of the authentication processing system 1 according to the embodiment. As exemplified in FIG. 4, the authentication processing system 1 according to the embodiment includes the user terminal 10, the providing device 50, the authentication server 100, a web server 200, and a device that is searched for by the providing device 50. These various kinds of devices are connected via a network N such that the devices can perform communication in a wired or a wireless manner. Furthermore, the number of various kinds of the devices is not limited to the number illustrated in FIG. 4 as an example and, for example, a plurality number of the user terminals 10 or the like may also be included in the authentication processing system 1.

The user terminal 10 is an information processing terminal, such as a desktop personal computer (PC), a notebook PC, a tablet terminal, and a mobile phone including a smartphone, or a personal digital assistant (PDA). Furthermore, the user terminal 10 may also include a wearable device such as an eyeglasses type or a watch type information processing terminal. Furthermore, the user terminal 10 may also include various smart devices having information processing functions. For example, the user terminal 10 may also include a smart home appliance, such as a television (TV), a refrigerator, a cleaner, or the like, and a smart vehicle, such as an automobile, a drone, a home robot, or the like.

The user terminal 10 includes various kinds of authentication devices. For example, the user terminal 10 includes a biometric authentication device that uses biometric information on a user. Consequently, the user terminal 10 performs, in the local, personal authentication of the user who uses the user terminal 10. As described above, the authentication device may also be software included in the user terminal 10 or may also be hardware connected to the user terminal 10.

The providing device 50 is an information processing apparatus that cooperates with the user terminal 10 and the authentication devices included in the user terminal 10 and that provides, to the user terminal 10 side, the function that is used for the user terminal 10 to receive the authentication process that is performed by the authentication server 100.

The authentication server 100 is a server device that performs personal authentication on the user who uses the user terminal 10. The authentication server 100 receives the authentication result information sent from the user terminal 10 side and verifies the authentication result information by using the associated public key. Then, the authentication server 100 returns the information (for example, authentication cookie) indicating that authentication has been completed to the user terminal 10. The user terminal 10 can perform, by using the authenticated information, the authentication process in a service provided by the web server 200 or the like. Alternatively, by sending the authenticated information to the web server 200, the authentication server 100 conveys that the authentication server 100 has authenticated that the user who uses the service is the user U01.

The web server 200 is a server device that provides various kinds of web pages when accessed by the user terminal 10. The web server 200 provides, for example, various kinds of web pages related to a news site, a weather forecast site, a shopping site, a finance (stock price) site, a route search site, a map providing site, a travel site, a eating place introduction site, a weblog, or the like.

When providing a service, the web server 200 may request personal authentication of a user. For example, when the web server 200 provides a settlement service, if the web server 200 is not able to authenticate that a user using the user terminal 10 is surely the user U01, the web server 200 can restrict the user terminal 10 from performing the settlement service. In contrast, if the web server 200 receives information indicating that authentication has been performed by the authentication server 100, the web server 200 trusts that the user using the user terminal 10 is the user U01 in question. In this case, the web server 200 accepts an operation, such as settlement by the user terminal 10, requested to personal authentication.

The device that is searched for by the providing device 50 is a device that becomes, when the user terminal 10 communicates with the authentication server 100, the providing source that provides the function used for communication. For example, the searched device includes the proxy terminal 30, the friend terminal 35, the shop terminal 40, and the cloud server 45. Furthermore, the function requested for communication between the user terminal 10 and the authentication server 100 differs depending on the function held by the user terminal 10 or the state of the user terminal 10. Consequently, the searched device is sometimes different in each search process performed by the providing device 50.

3. Configuration of the User Terminal

Figure 5:
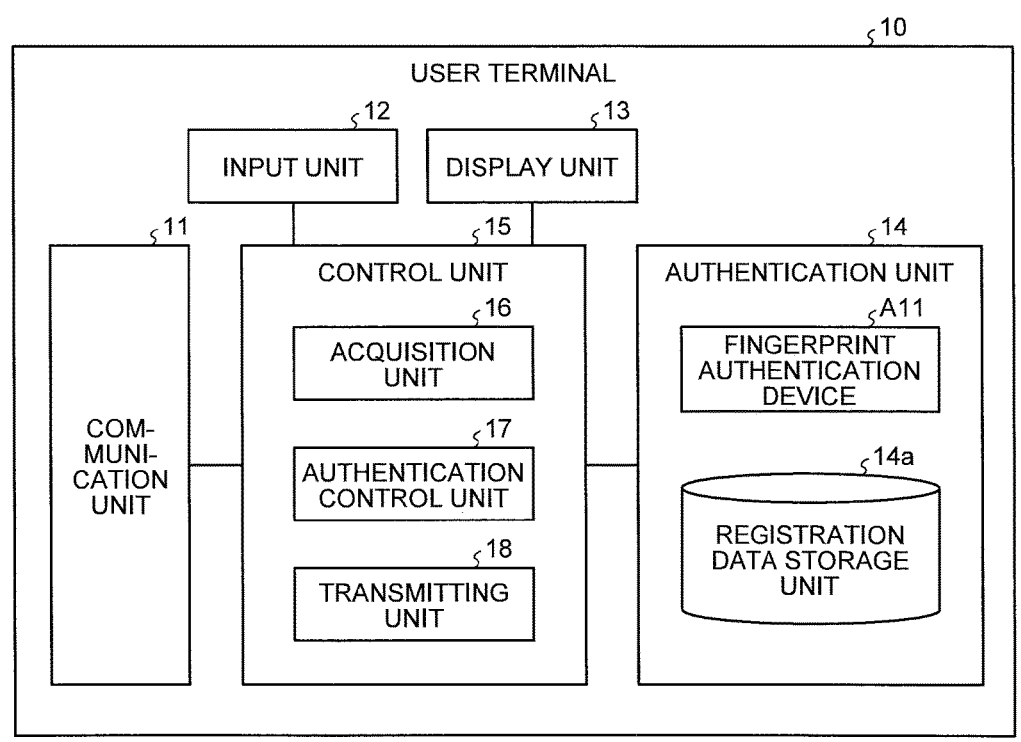
FIG. 5 is a schematic diagram illustrating a configuration example of a user terminal according to the embodiment.

In the following, the user terminal 10 according to the embodiment will be described with reference to FIG. 5. FIG. 5 is a schematic diagram illustrating a configuration example of the user terminal 10 according to the embodiment. As illustrated in FIG. 5, the user terminal 10 includes a communication unit 11, an input unit 12, a display unit 13, an authentication unit 14, and a control unit 15. Furthermore, the connection relation between the processing units included in the user terminal 10 is not limited to the connection relation illustrated in FIG. 5 and another connection relation may also be used.

The communication unit 11 is connected to the network N in a wired or a wireless manner and sends and receives information to and from the providing device 50, the authentication server 100, the web server 200, or the like. For example, the communication unit 11 is implemented by a network interface card (NIC), or the like.

The input unit 12 is an input device that accepts various kinds of operations from a user. For example, the input unit 12 is implemented by an operation key or the like provided in the user terminal 10. Furthermore, the input unit 12 may also include an image capturing device (a camera, etc.) for capturing an image, a voice collector (a microphone, etc.) that collects voices. The display unit 13 is a display device that displays various kinds of information. For example, the display unit 13 is implemented by a liquid crystal display or the like. Furthermore, if touch panel is used for the user terminal 10, a part of the input unit 12 is integrated with the display unit 13.

The authentication unit 14 performs authentication on the user who uses the user terminal 10. Specifically, the authentication unit 14 accepts, by using various kinds of authentication devices, the information that is input from the user. Then, the authentication unit 14 checks the data that is previously registered in the various kinds of the authentication devices against the input data. Then, the authentication unit 14 sends the check result to the control unit 15. Furthermore, the data that is previously registered in the authentication device is stored in a registration data storage unit 14a. Furthermore, in the registration data storage unit 14a, the information related to the authentication device that is used by the user terminal 10 is stored. For example, if the user U01 uses the cloud server 45 as an authentication device, the information related to the cloud server 45 (for example, an address used for a connection, etc.) is stored in the registration data storage unit 14a.

The authentication unit 14 includes, as an authentication device, for example, the fingerprint authentication device A11. The fingerprint authentication device A11 previously accepts registration of the fingerprint data from the user. Then, at the time of authentication, the fingerprint authentication device A11 accepts an input of the fingerprint from the user who uses the user terminal 10 and performs personal authentication by checking the input fingerprint against the registered fingerprint data. Furthermore, the authentication device is not limited to the fingerprint authentication device but may also be, for example, an iris authentication device, a voice print authentication device, or the like.

Furthermore, the user terminal 10 may also include, as an authentication device, other than the examples described above, an authentication device that uses various kinds of information. For example, the user terminal 10 may also be a face authentication device that performs authentication by using image data on a face of a user. Furthermore, if the user terminal 10 is a wearable device, the user terminal 10 may also use the provided various kinds of sensors as authentication devices. Namely, the user terminal 10 previously holds the sensor data acquired by the user and checks, when the sensor data is used by the user, against the previously held sensor data, thereby performing authentication of the identity of the user. Furthermore, the authentication device is not limited to the authentication device that performs authentication using biometric information. For example, the authentication device may also be a hardware authentication device that performs authentication by connecting a predetermined physical key owned by the user U01 to the user terminal 10 or may also be a SIM card authentication device that performs authentication by determining the content of a subscriber identity module card, i.e., a SIM card, embedded in the user terminal 10. Furthermore, the user terminal 10 may also include an authentication device that performs authentication on a user on the basis of the identification information that is allocated to a device connected by the user terminal 10. In this case, the authentication device determines, for example, the identification information (a media access control (MAC) address, etc.) that is uniquely allocated to a router or the like that is wirelessly connected to the user terminal 10. Then, the authentication device authenticates that the user who uses the user terminal 10 is the person in question if there is no discrepancy between the determined identification information and identification information on the device that is usually used by a user targeted for authentication.

The control unit 15 is implemented by, for example, a CPU (Central Processing Unit), a MPU (Micro Processing Unit), or the like executing various kinds of programs stored in a storage device in the user terminal 10 using a RAM (Random Access Memory) as a work area. Furthermore, the control unit 15 is implements by, for example, an integrated circuit, such as an application specific integrated circuit (ASIC), a field programmable gate array (FPGA), or the like.

The control unit 15 controls the authentication process performed in the user terminal 10, the process cooperated with the providing device 50, the management of the information that is sent and received to and from the authentication server 100 or the web server 200, or the like. As illustrated in FIG. 5, the control unit 15 includes an acquisition unit 16, an authentication control unit 17, and a transmitting unit 18 and implements or executes the function or the operation of the information processing described below. For example, by executing the application in the RAM as a work area described above, the control unit 15 implements the acquisition unit 16, the authentication control unit 17, and the transmitting unit 18. Furthermore, the internal configuration of the control unit 15 is not limited to the configuration illustrated in FIG. 5 but may be another configuration as long as the configuration in which the information processing described is performed below is used.

The acquisition unit 16 acquires various kinds of information. For example, The acquisition unit 16 receives the information sent from the authentication server 100 or the web server 200. Furthermore, the acquisition unit 16 receives a communication packet that is sent from the authentication server 100 or the web server 200 that requests personal authentication of the user who uses the user terminal 10. Furthermore, the acquisition unit 16 acquires various kinds of information requested by the authentication unit 14. For example, the acquisition unit 16 acquires, via the input unit 12, fingerprint data on a user who uses the user terminal 10. Furthermore, the acquisition unit 16 acquires the information related to the function provided by the providing device 50.

The authentication control unit 17 controls the process related to the authentication process. For example, the authentication control unit 17 operates, in accordance with the request for personal authentication from the authentication server 100, the fingerprint authentication device A11 included in the authentication unit 14. Then, the authentication control unit 17 controls the process of accepting an input of the fingerprint data received form the user U01 or the authentication process performed by the fingerprint authentication device A11.

Furthermore, the authentication control unit 17 controls communication with the providing device 50. For example, the authentication control unit 17 detects the information that is sent to the providing device 50 and that is related to the user terminal 10 indicating the type of the authentication device included in the user terminal 10 or indicating whether the user terminal 10 includes a creation means. Furthermore, the authentication control unit 17 accepts the function provided from the providing device 50. Then, the authentication control unit 17 uses the function accepted by the providing device 50 such that the communication with the authentication server 100 is established. Furthermore, if the user terminal 10 does not have the function that uses a protocol used for the communication with the authentication server 100, the authentication control unit 17 sends the subject information to the providing device 50 and performs control such that the communication using a specific protocol is established by using another terminal, such as the proxy terminal 30, or the like. Namely, by using the function provided by the providing device 50, the authentication control unit 17 performs an authentication process on the authentication server 100.

The transmitting unit 18 sends various kinds of information. For example, the transmitting unit 18 sends information on the present function or configuration of the user terminal 10 to the providing device 50. Furthermore, the transmitting unit 18 sends the authentication result information provided via the providing device 50 to the authentication server 100. Furthermore, the transmitting unit 18 sends, to the web server 200, or the like, the authenticated information sent from the authentication server 100.

Furthermore, the configuration of the user terminal 10 illustrated in FIG. 5 is an example and does not always need to include each of the processing units illustrated in FIG. 5 in the user terminal 10. For example, the user terminal 10 does not need to include therein the authentication device. In this case, by the user terminal 10 cooperating with the providing device 50, the externally provided function of the predetermined authentication device is provided to the user terminal 10.

4. Configuration of the Providing Device

Figure 6:
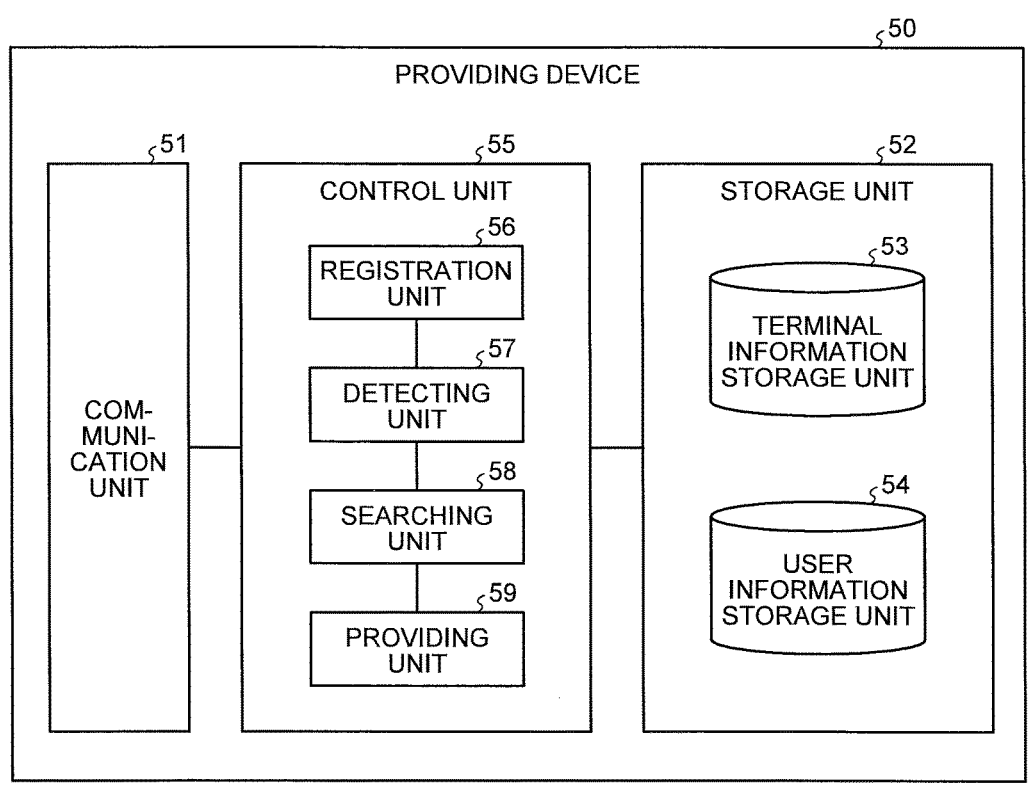
FIG. 6 is a schematic diagram illustrating a configuration example of a providing device according to the embodiment.

In the following, the configuration of the providing device 50 according to the embodiment will be described with reference to FIG. 6. FIG. 6 is a schematic diagram illustrating a configuration example of the providing device 50 according to the embodiment. As illustrated in FIG. 6, the providing device 50 includes a communication unit 51, a storage unit 52, and a control unit 55, cooperates with the user terminal 10, and performs various kinds of processes. Furthermore, the providing device 50 may also include an input unit (for example, a keyboard, a mouse, etc.) that accepts various kinds of operations from an administrator, or the like, who uses the providing device 50 and a display unit (for example, a liquid crystal display, etc.) that is used to display various kinds of information.

Communication Unit 51

The communication unit 51 is implemented by, for example, a NIC, or the like. The communication unit 51 is connected to the network N in a wired or wireless manner and sends and receives, via the network N, information to and from the user terminal 10 and the searched various kinds of terminals.

Storage Unit 52

The storage unit 52 is implements by, for example, a semiconductor memory device, such as a RAM, a flash memory, and the like or a storage device, such as a hard disk, an optical disk, and the like. The storage unit 52 includes the terminal information storage unit 53 and the user information storage unit 54.

Terminal Information Storage Unit 53

The terminal information storage unit 53 stores the information related to the terminal device that communicates with the providing device 50. In the following, an example of the terminal information storage unit 53 according to the embodiment is illustrated in FIG. 7. FIG. 7 is a schematic diagram illustrating an example of the terminal information storage unit 53 according to the embodiment. In the example illustrated in FIG. 7, the terminal information storage unit 53 includes the items, such as the "terminal ID", the "creation means", the "authentication device ID", the "registration destination", the "type", the "registration data", the "authentication user", the "reliability", and the "private key".

The "terminal ID" indicates the identification information for identifying a terminal device. Furthermore, in the embodiment, it is assumed that the terminal ID matches the reference numeral of the terminal device. For example, the terminal ID of the user terminal 10 is represented by "10" and the terminal ID of the proxy terminal 30 is represented by "30".

The "creation means" indicates whether the authentication server 100 has a function of creating authentication result information that can be received. In FIG. 7, if the item of the creation means is "0", this indicates that the authentication server 100 does not have the creation means, whereas, if the item of the creation means is "1", this indicates that the authentication server 100 has the creation means.

The "authentication device ID" indicates identification information for identifying an authentication device. Furthermore, in the embodiment, it is assumed that the authentication device ID matches the reference numeral of the authentication device. For example, the authentication device ID of the fingerprint authentication device A11 is represented by "A11".

The "registration destination" indicates the location of the registered authentication device. For example, in FIG. 7, if "inside" is indicated, this indicates that the subject authentication device is provided inside the terminal device. Furthermore, if the "shop terminal 40" or the "cloud server 45" is indicated, this indicates that an authentication device is provided inside the indicated device.

The "type" indicates the type of the authentication device. In the embodiment, the type of the authentication device is indicated by the information that is checked by the authentication device. For example, if the type of the authentication device is "fingerprint", this indicates that the subject authentication device performs personal authentication by using fingerprint data.

The "registration data" indicates information for identifying data previously registered for personal authentication in the authentication device. In FIG. 7, the "registration data" is conceptually indicated using "B11" or the like; however, in practice, in the item of the registration data, fingerprint data on a user, iris data on a user, voiceprint data on a user, and the like are stored. Furthermore, a plurality of pieces of registration data may also be registered in a single authentication device. For example, FIG. 7 indicates that two pieces of data, i.e., "B13" and "B33", are stored in the fingerprint authentication device A45. This indicates that, even when the same user "U01" performs registration in the fingerprint authentication device A45, if terminals at the registration source are different, the pieces of data themselves registered in the fingerprint authentication device A45 are different.

The "authentication user" indicates a user who is authenticated by an authentication device. Furthermore, regarding the authentication user, a plurality of authentication users may also be registered with respect to a single authentication device. In this case, the authentication device uses both the registration data and the authentication user as a single pair and includes at least the same number of pieces of registration data as that of the authentication users.

The "reliability" indicates the reliability of the authentication device managed by the providing device 50. In the example illustrated in FIG. 7, it is assumed that the reliability is indicated by values in five stages using 1 to 5 and it is assumed that the reliability is high as the number is greater. The item of the reliability may also automatically be set by a registration unit 56 according to the providing device 50 by referring, for example, to the list that indicates the reliability of the authentication device or, alternatively, may also be set by an administrator of the providing device 50. Furthermore, the item of the reliability may also be set by being specified by the authentication server 100. Furthermore, the item of the reliability may also be set for each registration data instead of each authentication device.

The item of the reliability is set in accordance with the type of the authentication device, the location in which the authentication device is present, or the like. For example, if information that is used by an authentication device to perform authentication on a person in question is biometric information, it is difficult for a third party to illegally perform personal authentication by using the authentication device, the reliability of the authentication device is determined to be high. Furthermore, regarding the authentication device present in a cloud, because there is a high possibility of receiving an illegal access from a third party, the reliability of the authentication device is determined to be low.

Furthermore, regarding the authentication device that is present in the shop terminal 40 placed in a shop that is disposed by a line providing company or the like, because it is difficult for a third party to illegally use the authentication device, the reliability of the authentication device is determined to be high. Furthermore, the setting methods of the reliability performed in this way are examples and the providing device 50 or the authentication server 100 may also set the reliability by using another various methods.

The "private key" indicates key information issued with respect to authentication of the authentication device that is registered with respect to the authentication server 100. The terminal device that has a means for creating authentication result information creates, by adding a signature using a private key, the result of authentication performed by the authentication device as authentication result information. The authentication result information is sent to the authentication server 100 by using a specific protocol and the authentication process is performed by the authentication server 100. Furthermore, it is assumed that the authentication server 100 stores therein a public key associated with a private key. Furthermore, even if the terminal does not have a creation means, there may be a case in which a private key has been issued to the authentication device that is used by the terminal. For example, if a terminal uses an external authentication device provided in the cloud server 45 or the like and if the cloud server 45 can create authentication result information, there may be a case in which a private key is issued to authentication performed by the subject authentication device.

Namely, FIG. 7 indicates that the terminal device identified by the terminal ID of "10" does not have a creation means but, as the authentication devices, "A11", "A40", and "A45" can be used. FIG. 7 indicates that, from among authentication devices, the fingerprint authentication device A11 is provided "inside" the user terminal 10, the PIN authentication device A40 is provided in the "shop terminal 40", and the fingerprint authentication device A45 is provided in the "cloud server 45". The pieces of the registration data are "B11", "B12", and "B13" and are registration data used to authenticate the user "U01". The reliability of the respective authentication devices are "3", "5", and "2". Furthermore, FIG. 7 indicates, as an example, that, from among the authentication devices used by the user terminal 10, the authentication devices registered in the authentication server 100 are "A40" and "A45" and the private keys each stored in the authentication devices are "K121" and "K131".

User Information Storage Unit 54

The user information storage unit 54 stores therein information related to a user who uses the providing device 50. Here, FIG. 8 indicates an example of the user information storage unit 54 according to the embodiment. FIG. 8 is a schematic diagram illustrating an example of the user information storage unit 54 according to the embodiment. In the example illustrated in FIG. 8, the user information storage unit 54 has the items, such as the "user ID", the "owned terminal ID", the "creation means", the "line providing company", the "reliable user", the "service ID", and the "authentication history information".

The "user ID" indicates identification information for identifying a user. Furthermore, it is assumed that the user ID matches the reference numeral of the user. For example, the user ID of the user U01 is represented by "U01".

The "owned terminal ID" indicates the terminal ID owned by the user. Furthermore, the "creation means" indicates whether each of the terminals has a creation means. The "line providing company" indicates information for identifying the company that provides the line used by the terminal. The terminal that uses the same line providing company can use, for example, the same shop terminal 40.

The "reliable user" indicates identification information on a user that is set as a reliable user by a predetermined user. The reliable user is set by, for example, a user setting to the providing device 50, a user offering to a line providing company, a user setting to the authentication server 100, or the like. It is assumed that the user who is set as the reliable user can share, with each other, the function of the own terminal with a user who is set as the reliable user or can provide a function that is insufficient in the other user. For example, the reliable user corresponds to a family of the subject user or a friend of the subject user.

The "service ID" is identification information that is related to a user and that is used when the service provided from the web server 200 is used. It is assumed that the service ID is issued for each service. FIG. 8 indicates the example in which a single service ID is issued to each user and the subject service ID is issued from the same service. The service ID is used, for example, one of the pieces of information that indicates the identity of the user.

The "authentication history information" is information indicating the history of the process performed by the providing device 50 on each of the users. In FIG. 8, the authentication history information is represented by the concept, such as "R01"; however, in practice, the authentication history information is constructed by a communication log between the user terminal 10 and the providing device 50, information related to the device searched for by the providing device 50, a communication log between the user terminal 10 and the authentication server 100, or the like. By referring to the authentication history information when the providing process is performed, the providing device 50 can promptly perform the providing process that is suitable for the user.

Namely, FIG. 8 indicates an example in which the user U01 identified by the user ID "U01" owns the terminals identified by the terminal IDs of "10" and "30", the terminal with the terminal ID of "10" does not have a creation means, the terminal with the terminal ID of "30" has a creation means, and the line providing company of each of the terminals is "001". Furthermore, FIG. 8 indicates an example in which the user U02 is set as the reliable user with respect to the user U01, the service ID of the user U01 is "Y01", and the authentication history information is "R01".

Control Unit 55

The control unit 55 is implemented by, for example, a CPU, an MPU, or the like executing various kinds of program (corresponding to an example of the providing program), which are stored in a storage device in the providing device 50, by using the RAM as a work area. Furthermore, the control unit 55 is implemented by, for example, an integrated circuit, such as an ASIC, an FPGA, or the like.

As illustrated in FIG. 6, the control unit 55 includes the registration unit 56, a detecting unit 57, a searching unit 58, and a providing unit 59 and implements or executes the function or the operation of the information processing described below. Furthermore, the internal configuration of the control unit 55 is not limited to the configuration illustrated in FIG. 6 and another configuration may also be used as long as the configuration in which the information processing, which will be described, is performed is used. Furthermore, the connection relation between the processing units included in the control unit 55 is not limited to the connection relation illustrated in FIG. 6 and may also be another connection relation.

Registration Unit 56

The registration unit 56 that registers information related to the terminal that uses the providing device 50 and related to a user. For example, the registration unit 56 receives the registration of the authentication device that is used for the user U01 who uses the user terminal 10 to perform authentication. Furthermore, the registration unit 56 may also register information by accepting an offer of the registration from the user U01 or may also register information that is obtained as the result of the process performed by the detecting unit 57 or the searching unit 58 and that is related to the terminal or the like acquired from the result. For example, the registration unit 56 registers the information related to the user terminal 10 that is used by the user U01 who is to be authenticated, the information related to the user U01, or the like. Furthermore, the registration unit 56 registers the information related to the terminal device (for example, the proxy terminal 30) other than the user terminal 10 that is used by the user U01 or the information related to the friend terminal 35 or the like that is used by the user U02 who is a user relied by the user U01. The registration unit 56 appropriately stores the registered information in the terminal information storage unit 53 or the user information storage unit 54.

Furthermore, the registration unit 56 updates the registered information. For example, after having registered the information related to the reliability of the authentication device, if it is detected that the reliability of the authentication device is decreased (for example, in a case in which an illegal use by a third party is detected), the registration unit 56 updates the information such that the reliability of the subject authentication device is decreased. Furthermore, the registration unit 56 may also update, on the basis of the information sent from the authentication server 100, the information related to the authentication device. For example, the registration unit 56 updates, on the basis of the value of the reliability specified by the authentication server 100, the value of the reliability that is set in the authentication device. In this way, the registration unit 56 manages the information on the authentication devices or the like provided in each of the terminals and guarantees the reliability of the authentication device, whereby the registration unit 56 guarantees the appropriateness of authentication of a user performed in the local.

Detecting Unit 57

The detecting unit 57 detects a function, from among functions used for communication with the authentication server 100 that authenticates the identity of a user by verifying a signature of authentication result information that is information created by adding the signature using a predetermined private key to an authentication result obtained by an authentication device that performs personal authentication on the user and that is information processed by a specific authentication procedure, that is not held by the user terminal 10 that is used by the subject user.

Here, the function detected by the detecting unit 57 can be summarized. Namely, the detecting unit 57 detects, in a process or receiving personal authentication from the authentication server 100, a function (a creation function) to create authentication result information that is created on the basis of an authentication result of an authentication device and that is information processed by a function (authentication function) of an authentication device used by the user terminal 10 side that requests authentication or processed by a specific authentication procedure (protocol) prescribed by the authentication server 100. Furthermore, the detecting unit 57 also detects various kinds of functions (means) used to implement the authentication function or the creation function. For example, the detecting unit 57 may also detect an authentication device, from among the authentication devices, that can perform personal authentication by using the authentication function that is different from the authentication device provided in the terminal side.

Namely, the detecting unit 57 detects, first, as detection of a function that is not held by the user terminal 10, whether the user terminal 10 has a function to perform authentication on the local side. Then, if the user terminal 10 does not have the authentication function itself, the detecting unit 57 detects one of the authentication devices in order to provide one of the authentication devices to the user terminal 10. Furthermore, the detecting unit 57 may also detect an appropriate authentication device on the basis of the use state or the like of the user terminal 10 from among one of the detected authentication devices. In contrast, if the user terminal 10 has the authentication function itself, the detecting unit 57 may also the authentication device that has a different authentication function (authentication method) such that a user can perform further convenient authentication.

For example, if the terminal side has the fingerprint authentication device A11 and has the function to perform personal authentication of the user, the detecting unit 57 detects the authentication device that uses another authentication method. Specifically, the detecting unit 57 can detect an iris authentication device that has a function to perform authentication by checking, as the function that is not held by the user terminal 10, iris data on the user, or a voice print authentication device that has a function to perform authentication by checking, as the function that is not held by the user terminal 10, audio data on a user. Furthermore, for example, although the terminal side has the function to create authentication result information that is associated with a certain protocol, if the terminal side does not have the function to create authentication result information that is associated with another protocol, the detecting unit 57 detects the function to create the authentication result information that is associated with the subject protocol. In this way, the detecting unit 57 detects, as the function that is not held by the terminal side, the function that is used for communication with the authentication server 100 and the function (means) that is used to implement the function used for the communication. In this way, when the user terminal 10 that is used by the user receives authentication from the authentication server 100, the detecting unit 57 detects the function used for the communication with the authentication server 100. Consequently, even if the user terminal 10 has, for example, a certain authentication device, if the user terminal 10 does not have the authentication device that uses another authentication method, the user terminal 10 can detect, by using the providing device 50, the authentication device that uses the other authentication method and uses the authentication device.

Furthermore, by detecting a function insufficient in the user terminal 10 that attempts to perform communication from among various kinds of functions needed for communication with the authentication server 100, the detecting unit 57 specifies the function that is to be provided to the user terminal 10 side in order to receive authentication from the authentication server 100.

For example, the detecting unit 57 detects the function that is used for communication with the authentication server 100 in accordance with the status of the user terminal 10 at the time when the communication is requested by the authentication server 100. Namely, the detecting unit 57 acquires the status of the user terminal 10 at the time when the user terminal 10 is requested, from the authentication server 100, for the authentication to be performed by the authentication device. Then, the detecting unit 57 detects, on the basis of the acquired information, the function insufficient in, for example, the user terminal 10. In this way, by performing the detecting process on the basis of the status at the time when the user terminal 10 is requested for authentication, the detecting unit 57 can detects, with priority, the function appropriate for the subject status. Furthermore, the detecting unit 57 can detect, on the basis of the environment of the user terminal 10, the function that is used for the communication with the authentication server 100. For example, if the user terminal 10 has an iris authentication device and if it is not able to capture an iris due to low illumination in the environment placed for the user terminal 10, the detecting unit 57 can detect, on the basis of the subject environment, an authentication device that uses an authentication method that is different from that used by the iris authentication device. Furthermore, in the subject process, the detecting unit 57 may also appropriately acquire information on, for example, various kinds of sensors (illuminance sensor, etc.) included in the user terminal 10 and use the acquired information.

Furthermore, the detecting unit 57 may also detect the function that is used to create the authentication result information that satisfies the authentication strength requested by the authentication server 100. The authentication strength mentioned here is an index value that indicates, in the authentication process, the certainty indicating the person in question without doubt. For example, in order to ensure the security of a service, the authentication server 100 may sometimes restrict the process performed by the providing device 50 as a proxy. For example, in the authentication process performed in the local, regarding a proxy process performed by a device, such as the cloud server 45, that has low reliability, the authentication server 100 does not possibly authenticate the authentication result information created by proxy on the basis of the assumption that the requested authentication strength is not ensured. The detecting unit 57 detects, in accordance with the request from the authentication server 100, the function that satisfies the authentication strength. For example, if a plurality of authentication devices is present in the user terminal 10, the detecting unit 57 detects the authentication device with the highest reliability. In this way, the detecting unit 57 can detect, with priority, the function that is assumed to satisfy the request from the authentication server 100.

Furthermore, when the user terminal 10 sends, on the basis of the information registered by the registration unit 56, the authentication result information to the authentication server 100, the detecting unit 57 may also detect the function insufficient for the communication with the authentication server 100. For example, as illustrated in FIG. 7, the information indicating that the user terminal 10 does not have a creation means is stored in the terminal information storage unit 53 by the registration unit 56. In this case, by referring to the terminal information storage unit 53, the detecting unit 57 can detect, without acquiring the information from the user terminal 10, that the function of the creation means is insufficient. In this way, by using previously registered information, the detecting unit 57 can reduce the load applied to the process and improve the efficiency of the process.

Searching Unit 58

The searching unit 58 searches for an external device that has the function associated with the function that is detected by the detecting unit 57. For example, if the detecting unit 57 detects the function insufficient in the user terminal 10 that communicates with the authentication server 100, in order to act as a proxy for the detected function, the searching unit 58 searches for an external device that has the function associated with the detected function.

The searching unit 58 may also search the external device by referring to the information stored in the terminal information storage unit 53 or the user information storage unit 54 or may also search the external device by using a predetermined crawl function to search the network. For example, the searching unit 58 searches for, as the external device that acts as a proxy for the user terminal 10, the proxy terminal 30 that is the terminal other than the user terminal 10 owned by the user, the friend terminal 35 that is the terminal owned by a person involved (for example, a family or a friend) of the user, the shop terminal 40 disposed in a shop operated by a predetermined business person, the cloud server 45 in a cloud that can be used via the network, or the like. In this way, the searching unit 58 may also search for various kinds of external devices and procure an authentication device function or a creation means that can be used.

Providing Unit 59

The providing unit 59 provides the function associated with the function detected by the detecting unit 57 to the user terminal 10 side that sends the authentication result information to the authentication server 100. Namely, the providing unit 59 acquires the information that is detected by the detecting unit 57 and that is related to communication with the authentication server 100 and provides these functions to the user terminal 10 side. Specifically, the providing unit 59 provides the function that is detected by the detecting unit 57 and that is associated with the function insufficient in the user terminal 10 to the user terminal 10 side.

The providing unit 59 provides various kinds of functions by cooperating with the detecting unit 57 and the searching unit 58 such that the user terminal 10 communicates with the authentication server 100 without any problem. For example, in accordance with the status of the user terminal 10 at the time when communication is requested by the authentication server 100, if the function insufficient for the communication with the authentication server 100 is detected, the providing unit 59 provides the function that is associated with the insufficient function to the user terminal 10 side. Furthermore, if the user terminal 10 side requests the authentication server 100 to send authentication result information that has the predetermined authentication strength, the providing unit 59 provides the function that satisfies the request to the user terminal 10 side.

Furthermore, when providing a function, the providing unit 59 appropriately uses the information stored in the terminal information storage unit 53 or the user information storage unit 54. For example, when the providing unit 59 acquires the information indicating that there is a plurality of terminals owned by the user U01 who is targeted for authentication, if the proxy terminal 30 that has a creation means is included in the terminal owned by the user U01, the providing unit 59 provides the function owned by the proxy terminal 30 to the user terminal 10 side. In this way, if a function that can be used by a user targeted for authentication is present close to the user, the providing unit 59 may also provide, with priority, the subject function to the user.

Furthermore, if the user terminal 10 does not have an authentication device or if the terminal owned by the user terminal 10 is not able to be used, the providing unit 59 may also provide, on the basis of a predetermined condition, the authentication device that performs authentication on the user U01. For example, when the user terminal 10 accepts an authentication request from the authentication server 100, the providing unit 59 refers to the reliability of the requested authentication. For example, if the service attempted to be used by the user terminal 10 requests high reliability for the personal authentication, the authentication server 100 can request that the authentication performed in the user terminal 10 be performed in the authentication device with high reliability. Specifically, the web server 200 that provides a settlement service or the like desires to perform authentication with high reliability with respect to the user U01 who uses the user terminal 10.

In this case, the providing unit 59 selects, on the basis of the information related to the reliability of the authentication device, the authentication device that are based on the creation of the authentication result information. Specifically, the providing unit 59 provides, to the user U01 with priority, the authentication devices with the reliability of "4" or more. The user terminal 10 may also display the information on, for example, the display unit 13 and notify the user of the information. As an example, by displaying information indicating that "please perform authentication via the shop terminal 40" on the display associated with the display unit 13, the user terminal 10 notifies the user of the selected authentication devices. At this point, the providing unit 59 establishes the connection between, for example, the user terminal 10 and the shop terminal 40 and urges the user terminal 10 to send a PIN code, whereby the providing unit 59 provides the function of the authentication device with high reliability.

Furthermore, the providing unit 59 may also provide, to the user terminal 10 in accordance with the request received from the user terminal 10, the function detected by the detecting unit 57. For example, the providing unit 59 accepts, from the user terminal 10, a request for using an external terminal or an external function that is more convenient than the user terminal 10 that is currently used by the user. Then, the providing unit 59 provides, in accordance with the request accepted from the user terminal 10, the function that has been detected by the user terminal 10. In this way, the user can perform the authentication process by using the providing device 50 while using a desired function.

5. Configuration of the Authentication Server

Figure 9:
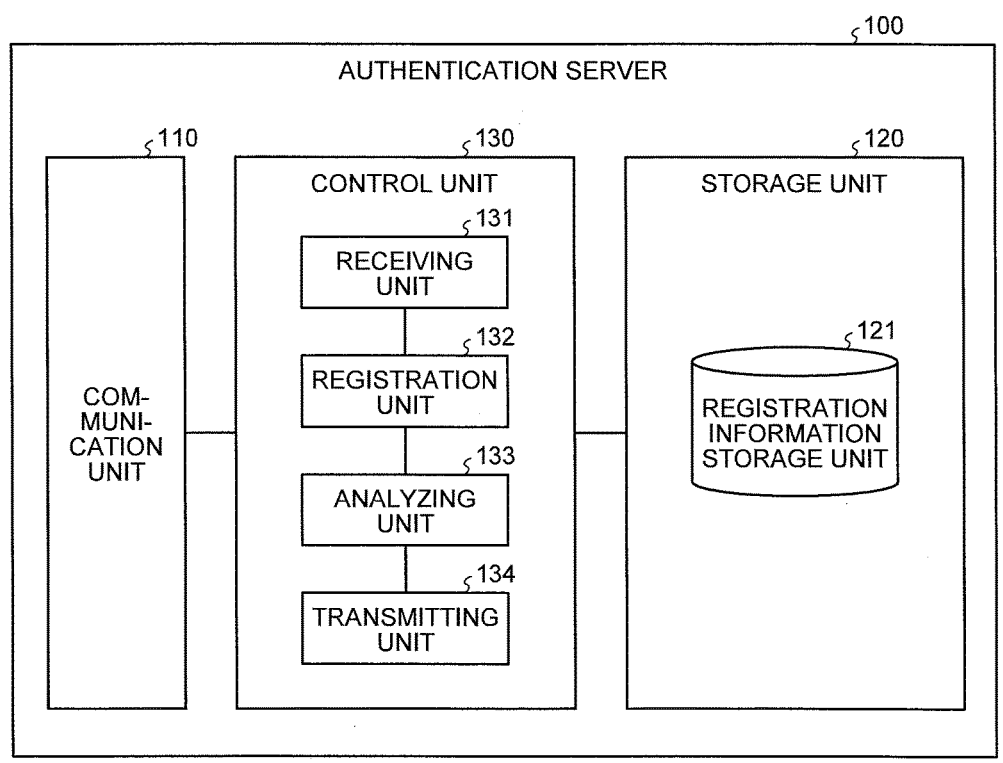
FIG. 9 is a schematic diagram illustrating a configuration example of an authentication server according to the embodiment.

In the following, the configuration of the authentication server 100 according to the embodiment will be described with reference to FIG. 9. FIG. 9 is a schematic diagram illustrating a configuration example of the authentication server 100 according to the embodiment. As illustrated in FIG. 9, the authentication server 100 includes a communication unit 110, a storage unit 120, and a control unit 130. Furthermore, the authentication server 100 may also include an input unit (for example, a keyboard, a mouse, etc.) that accepts various kinds of operations from an administrator or the like who uses the authentication server 100 or a display unit (for example, a liquid crystal display, etc.) that is used to display various kinds of information.

Communication Unit 110

The communication unit 110 is implemented by, for example, a NIC or the like. The communication unit 110 is connected to the network N in a wired or a wireless manner and sends and receives, via the network N, information to and from the user terminal 10 or the web server 200. Furthermore, when the communication unit 110 sends and receives authentication result information to and from the user terminal 10, the communication unit 110 performs communication by using a specific protocol with high security.

Storage Unit 120

The storage unit 120 is implemented by, for example, a semiconductor memory device, such as a RAM, a flash memory, and the like or implemented by a storage device, such as a hard disk, an optical disk, or the like. The storage unit 120 includes a registration information storage unit 121.

Registration Information Storage Unit 121

The registration information storage unit 121 stores therein information related to the authentication device registered in the authentication server 100. Here, FIG. 10 indicates an example of the registration information storage unit 121 according to the embodiment. FIG. 10 is a schematic diagram illustrating an example of the registration information storage unit 121 according to the embodiment. In the example illustrated in FIG. 10, the registration information storage unit 121 has the items, such as the "communication destination information", the "authentication device ID", the "type", the "registration data", the "authentication user", the "reliability", and the "public key".

The "communication destination information" indicates the communication destination in which the authentication device is present. The communication destination is, for example, a terminal device or a server device. Specifically, in the item of the communication destination information, information for identifying the proxy terminal 30 or the like that is a terminal device that can communicate with the authentication server 100 is stored.

The items, such as the "authentication device ID", the "type", the "registration data", the "authentication user", and the "reliability" are associated with the respective items described in FIG. 7. The "public key" is key information that is sent from the authentication device side at the time of registration of the authentication device and indicates the key that is associated with the private key that is issued at the same time. Because the public key is issued for each registration data, the public key is stored by being associated with the registration data.

Namely, FIG. 10 indicates that, in the proxy terminal 30" that is the communication destination, the registered authentication devices are "A31" and "A32"; the type of respective authentication is "iris" and "voice print"; the respective pieces of registration data are "B31" and "B32"; both of the pieces of registration data authenticate the user "U01"; the reliability of each of the authentication devices is "4" and "3"; and the public keys are "K312" and "K322". Furthermore, this example indicates that the user U01 performs authentication in the iris authentication device A31; checking against the registration data B31 is performed; and, if the authentication result information is created by using the subject result, the authentication server 100 verifies the authentication result information by using the public key "K312".

Control Unit 130.

The control unit 130 is implemented by, for example, a CPU, an MPU, or the like executing various kinds of programs (corresponding to an example of the creation program), which is stored in a storage device inside the authentication server 100, by using a RAM as a work area. Furthermore, the control unit 130 is implemented by, for example, an integrated circuit, such as an ASIC, an FPGA, or the like.

As illustrated in FIG. 9, the control unit 130 includes a receiving unit 131, a registration unit 132, an analyzing unit 133, and a transmitting unit 134 and implements or executes the function or the operation of the information processing described below. Furthermore, the internal configuration of the control unit 130 is not limited to the configuration illustrated in FIG. 9 and another configuration may also be used as long as the configuration in which the information processing described below is performed. Furthermore, the connection relation between the processing units included in the control unit 130 is not limited to the connection relation illustrated in FIG. 9 and may also be another connection relation.

Receiving Unit 131

The receiving unit 131 receives various kinds of information. For example, the receiving unit 131 receives, from a device that desires authentication performed by the authentication server 100, a request for registration of the authentication device. Furthermore, for example, if the user terminal 10 accesses the web server 200 and if a service provided by the web server 200 at the access destination requests the user terminal 10 to perform authentication, the receiving unit 131 receives the subject authentication request from the web server 200. In this case, in response to the authentication request accepted by the receiving unit 131, the transmitting unit 134, which will be described later, sends a notification to the user terminal 10 that the user terminal 10 needs to perform authentication. Furthermore, the receiving unit 131 receives, in the authentication process, authentication result information that is the information created on the basis of the authentication result that was performed in the local. The receiving unit 131 sends and receives, by using the specific protocol prescribed by the authentication server 100, the authentication result information to and from the user terminal 10.

Registration Unit 132

The registration unit 132 registers the information related to an authentication device. For example, the registration unit 132 registers, on the basis of the information received by the receiving unit 131, the authentication device included in the terminal device that requests the registration. The registration unit 132 stores the registered information in the registration information storage unit 121.

Furthermore, the registration unit 132 associates a public key, from among the public keys and the private keys that are paired with the registration data in each of the authentication server 100 and the authentication device, with the registration data and then stores therein the associated public key and the registration data. When analyzing the authentication result information, the analyzing unit 133 refers to the public key registered by the registration unit 132 and verifies the authentication result information. Furthermore, the registration unit 132 manages the reliability of the authentication device. For example, the registration unit 132 refers to the terminal device that requests the authentication server 100 to perform authentication or refers to the authentication device that is used by the providing device 50 and determines the reliability of each of the authentication devices, whereby the registration unit 132 updates the value of the reliability of the authentication device stored in the registration information storage unit 121. For example, due to the setting of the authentication server 100 performed by an administrator, the registration unit 132 updates the reliability of the authentication device. Furthermore, if an authentication process is repeated, the registration unit 132 may also update the reliability of the authentication device by using a learning process. For example, if authentication that is performed on a specific user by a predetermined authentication device is repeated and if it is observed that authentication is being performed a predetermined number of times or more without any problem, the registration unit 132 may also perform an update, such as an increase in the reliability of the subject authentication device.

Furthermore, the authentication device registered by the registration unit 132 is not limited to the terminal device that is used by a user who requests an authentication process but may also be, for example, the shop terminal 40 that is used by a plurality of users or the authentication device included in the cloud server 45. In this case, the registration unit 132 accepts registration of a public key, for example, for each user who registers registration data in the authentication device included in the shop terminal 40.

Analyzing Unit 133

The analyzing unit 133 analyzes the authentication result information. Specifically, the analyzing unit 133 analyzes the authentication result information sent from the user terminal 10 specifies, on the basis of the authentication result information, a user to be authenticated. At this point, the analyzing unit 133 verifies, via the registration unit 132, the authentication result information by using the public key associated with the authentication device that is the creation source of the authentication result information.

Then, if the analyzing unit 133 confirms the verification using the public key that is associated with the private key that is used when the authentication result information is created, the analyzing unit 133 recognizes the authentication result information sent from the user terminal 10 as normal authentication information. Then, the analyzing unit 133 sends information indicating that the authentication result information has been authenticated to the transmitting unit 134 and allows the transmitting unit 134 to send the information to the user terminal 10 (or the web server 200).

Furthermore, if the authentication device that has created the authentication result information is a device with the reliability lower than a predetermined reference, the analyzing unit 133 does not need to recognize the identity of the user indicated by the authentication result information. For example, if the authentication device that has created the authentication result information is not stored in the registration information storage unit 121 that is managed by the registration unit 132 or if the value of the reliability of the authentication device at the creation source is particularly low, the analyzing unit 133 does not need to recognize the identity of the user indicated by the subject authentication result information.

Transmitting Unit 134

The transmitting unit 134 transmits various kinds of information. For example, if the transmitting unit 134 is requested to perform authentication of the identity of the user who uses the user terminal 10 at the time of using a service, the transmitting unit 134 sends information indicating a request for authentication to the user terminal 10. Furthermore, the transmitting unit 134 transmits, to the user terminal 10 or the web server 200, the information to which a signature is added by using the public key by the analyzing unit 133 that analyzes the authentication result information.

6. Flow of Process 6-1. Flow of a Process Performed by the Providing Device

Figure 11:
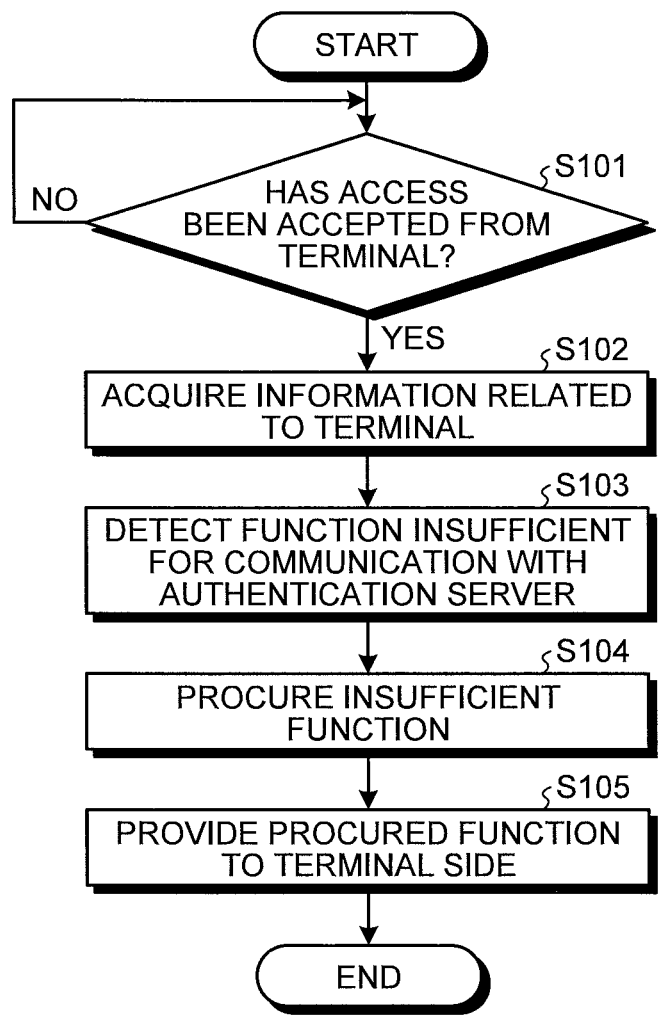
FIG. 11 is a flowchart illustrating the flow of the providing process according to the embodiment.

In the following, the flow of a process performed by the providing device 50 according to the embodiment will be described with reference to FIG. 11. FIG. 11 is a flowchart illustrating the flow of the providing process according to the embodiment.

As illustrated in FIG. 11, the providing device 50 determines whether an access has been accepted from a terminal, such as the user terminal 10 or the like (Step S101). If the providing device 50 has not accepted an access (No Step S101), the providing device 50 waits until the providing device 50 accepts an access.

In contrasts, if the providing device 50 accepts an access (Yes at Step S101), the providing device 50 acquires information related to the terminal (Step S102). Furthermore, regarding the information on the functional configuration or the like on a terminal, the providing device 50 may also previously accept the registration of the subject information from the terminal.

Then, the providing device 50 detects, regarding the accessed terminal, the function insufficient for communication with the authentication server 100 (Step S103). Then, the providing device 50 procures the detected and insufficient function (Step S104).

Then, the providing device 50 provides the procured function to the terminal side (Step S105). Consequently, the terminal can perform communication with the authentication server 100 and can receive authentication from the authentication server 100.

6-2. Flow of the Process in the Authentication Processing System

Figure 12:
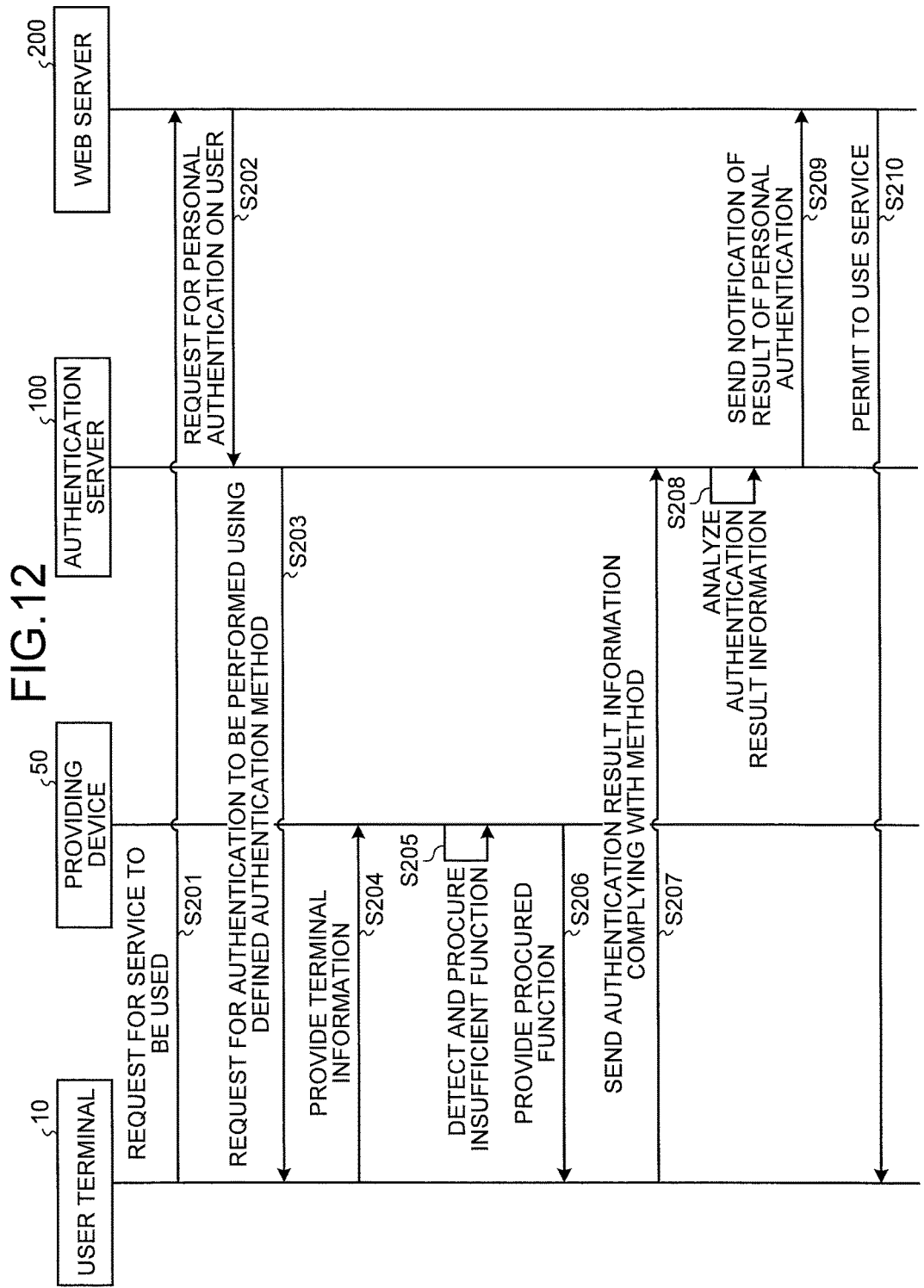
FIG. 12 is a sequence diagram illustrating the flow of the authentication process according to the embodiment.

In the following, the flow of the process performed by the authentication processing system 1 according to the embodiment will be described with reference to FIG. 12. FIG. 12 is a sequence diagram illustrating the flow of the authentication process according to the embodiment.

First, the user terminal 10 requests the web server 200 to use a service (Step S201). The web server 200 responds to the request for the service and requests the authentication server 100 to perform personal authentication on the user terminal 10 (Step S202).

The authentication server 100 responds to the request from the web server 200 and requests the user terminal 10 to perform authentication by using the prescribed authentication method (Step S203). Thus, the user terminal 10 that is not able to complete, by itself, the authentication process on the authentication server 100 accesses the providing device 50 and provides the own terminal information (Step S204).

The providing device 50 detects, regarding the user terminal 10 that received the access, the function insufficient for the communication with the authentication server 100. Furthermore, the providing device 50 procures the function that is associated with the detected function (Step S205).

Then, the providing device 50 provides the procured function to the user terminal 10 (Step S206). Then, the user terminal 10 performs authentication in the local by using the function provided from the providing device 50 and creates authentication result information that is on the basis of the subject result. Then, the user terminal 10 sends the authentication result information complying with the method requested by the authentication server 100 (Step S207).

The authentication server 100 analyzes the authentication result information sent from the user terminal 10 (Step S208). Specifically, the authentication server 100 verifies the authentication result information by using the associated public key. Then, the authentication server 100 completes the authentication process on the user when the authentication result information is verified. Then, the authentication server 100 notifies the web server 200 result of the personal authentication indicating that the user has been authenticated (Step S209).

The web server 200 permits, on the basis of the notified information, the user to use the requested service based on the assumption that the personal authentication of the user who uses the user terminal 10 has been guaranteed (Step S210).

7. Modification

The providing process performed by the providing device 50 described above may also be performed with various kinds of embodiments other than the embodiment described above. Therefore, another embodiment of the providing device 50 will be described below.

7-1. Embodiment of the Providing Device

In the embodiment described above, an example has been described in which the providing device 50 performs a providing process as an individual information processing apparatus. However, the providing device 50 may also be performed with various kinds of embodiments. For example, the providing device 50 may also be implemented as an IC chip embedded in the user terminal 10. Furthermore, the providing device 50 may also be implemented by a program (application) obtained by integrating the functions of the communication unit 51 and the control unit 55. If the providing device 50 is an application, the subject application is executed by being installed in the user terminal 10 in accordance with an operation performed by a user. Furthermore, in this case, the storage unit 52 is implemented by, for example, being used by a predetermined storage area included in the user terminal 10.

7-2. Operation of the Authentication Processing System

In the embodiment described above, an example has been described in which the providing device 50 searches for a predetermined external device, such as the proxy terminal 30 or the like, and procures the function used for the authentication process. Here, regarding each of the devices included in the authentication processing system 1, the providing device 50 may also detect and procure the function of each of the devices by using the predetermined application.

Namely, it is assumed that, in the user terminal 10, the proxy terminal 30, the friend terminal 35, or the like, a common application that is provided from an administrator (for example, a business person who provided a predetermined service) who manages the providing device 50 is installed. By controlling the subject application, for example, the providing device 50 acquires various kinds of information, such as information on a function insufficient in the user terminal 10, information indicating that the function to make up for the user terminal 10 is held by the proxy terminal 30 or the friend terminal 35, or the like. Furthermore, the providing device 50 provides, via the application, the function held by the proxy terminal 30 or the friend terminal 35 to the user terminal 10. In this way, by installing the common application to each of the devices included in the authentication processing system 1, the providing device 50 can promptly and accurately implement the process described in the above embodiment.

7-3. Multi-Factor Authentication

In the embodiment described above, an example has been described in which, because the providing device 50 provides a function to the user terminal 10, a part of the function is acted as a proxy in the communication performed by the user terminal 10 with respect to the authentication server 100. Here, in order to enhance the security of the authentication process, if the process that is to be originally performed is acted as a proxy, the providing device 50 may also use multi-factor authentication.

For example, if the authentication process performed on the user terminal 10 side is acted as a proxy by the authentication device included in the cloud server 45, the providing device 50 may also perform authentication by combining another factor, instead of performing authentication using a single piece of biometric information. For example, it is assumed that fingerprint data is sent from the user terminal 10 to the cloud server 45 and authentication is performed on the base of the fingerprint data. In this case, when the providing device 50 provides the function of the authentication device in the cloud server 45, for example, the providing device 50 sets the condition of the line to the cloud server 45. For example, the providing device 50 uses authentication performed by using a line as one of the factors, such as communication from the user terminal 10 to the cloud server 45 being permitted only for a line provided by the line providing company C01. In this case, even if fingerprint data is sent via a different line, the cloud server 45 does not recognize the data as effective data. In this way, by limiting the line that is assumed to be used by the user terminal 10, the providing device 50 can prevent an improper use of the authentication process due to masquerading as a third party. Furthermore, the example of the multi-factor authentication is not limited to the above but may also be performed by, in combination, an authentication means using the authentication device in the embodiment described above, the service ID, and the like (for example, the cloud server 45 may also request an input of the service ID together with fingerprint data and perform personal authentication on the basis of the information).

7-4. Station

The shop terminal 40 or the cloud server 45 described in the embodiment above may also be implemented by another embodiment. For example, the shop terminal 40 or the cloud server 45 may also be implemented by an embodiment of an authentication station that is set in a predetermined location, such as town or the like. In this case, if a function to receive authentication performed by the authentication server 100 is insufficient in the user terminal 10, the providing device 50 may also provide the function used for authentication to the user U01 who uses the user terminal 10 by using a method of notifying the user U01 of the set location of the authentication station. Then, the user U01 receives authentication performed by the authentication server 100 by using the authentication station and allowing the authentication station to act as a proxy for the function insufficient in the user terminal 10. For example, if an authentication device is not included in the user terminal 10, the authentication station adds the function performed as the authentication device or adds a signature to the authentication result and then acts as a proxy for a process of performing transmission to the authentication server 100. Furthermore, in order to perform personal authentication on the user U01, the providing device 50 may also request the user U01 to perform an advance registration of the user U01 with respect to the authentication station or may also request the user U01 to input the ID that is used to use the authentication station.

7-5. Detection of Function

In the embodiment described above, an example has been described in which the providing device 50 detects a function or provides a function to the user terminal 10 on the basis of the reliability associated with the function that can be used by a user. Here, the providing device 50 may also provide a function on the basis of an index value other than the reliability.

For example, the providing device 50 may also select a function provided to the user terminal 10 by using the cost needed to provide the function as an index value. The cost needed to provide the function is, for example, time an effort needed when a user uses the function. Namely, by providing a user friendly function with priority, the providing device 50 can perform the providing process highly convenient for the user.

For example, the providing device 50 determines the access to the external device is highly convenient for the user from among the external devices that have the detected function. In this case, by acquiring the location information on the user terminal 10 and the location information on the external device that has the detected function, the providing device 50 provides the function that is more convenient function for the user of the user terminal 10. For example, the providing device 50 may also register the information related to the shop that has the shop terminal 40 in the storage unit 52 and acquire the subject information. Furthermore, the providing device 50 may also search the network by using a predetermined crawl function and acquire the location information on an external device even if the external device is not registered in the registration unit 56. Furthermore, the providing device 50 may also use a global positioning system (GPS) or the like and specify the location information on both the user terminal 10 and the external device.

In this way, the providing device 50 may also provide the detected function to the user terminal 10 on the basis of the procurement cost associated with the function that can be used by a user. Consequently, the providing device 50 can submit an external device that is assumed for a user to more useful and can urge to use the subject external device.

7-6. Configuration of Each Device

In the embodiment described above, the configuration examples of the user terminal 10, the providing device 50, and the authentication server 100 have been described with reference to FIGS. 5, 6, and 9. However, each of the devices included in the authentication processing system 1 is not always implemented by the exemplified configuration. For example, the user terminal 10 need not always include all of the processing units exemplified in FIG. 5. Namely, the user terminal 10 need not always include the display unit 13 or the authentication unit 14. Furthermore, the user terminal 10 may also be separated into two or more devices and the configuration illustrated in FIG. 5 may also be implemented. For example, the user terminal 10 may also be implemented by two or more devices having configuration in which an authentication device that includes at least the authentication unit 14 and the authentication control unit 17 is separated from a communication device that includes at least the communication unit 11 and the transmitting unit 18.

8. Hardware Configuration

Figure 13:
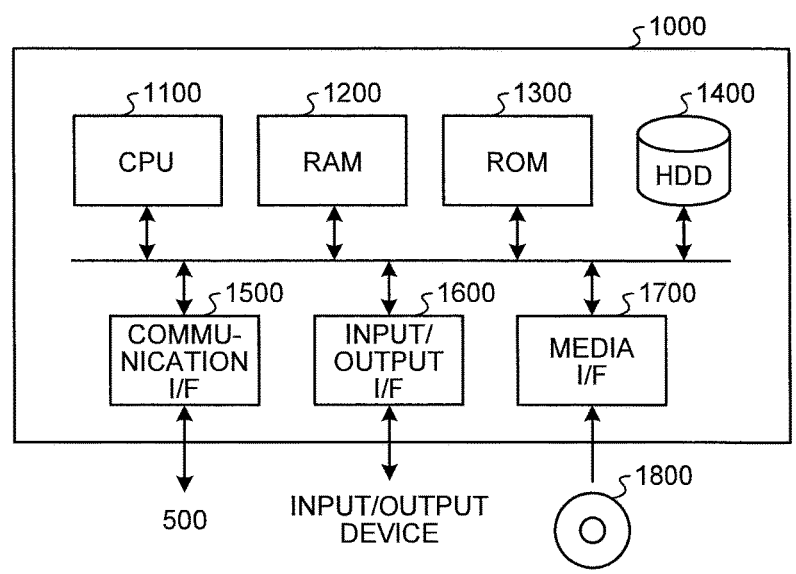
FIG. 13 is a hardware configuration diagram illustrating an example of a computer that implements the function performed by the providing device.

The user terminal 10, the providing device 50, and the authentication server 100 according to the embodiment described above are implemented by, for example, a computer 1000 having the configuration illustrated in FIG. 13. In the following, a description will be given by using the providing device 50 as an example. FIG. 13 is a hardware configuration diagram illustrating an example of the computer 1000 that implements the function performed by the providing device 50. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates on the basis of the programs stored in the ROM 1300 or the HDD 1400 and performs control of each device. The ROM 1300 stores therein a boot program that is executed by the CPU 1100 at the time of a startup of the computer 1000, a program that depends on the hardware of the computer 1000, or the like.

The HDD 1400 stores therein the program executed by the CPU 1100, data used by the subject program, and the like. The communication interface 1500 receives data from another device via a communication network 500 (corresponds to the network N illustrated in FIG. 4), sends the received data to the CPU 1100, and sends the data created by the CPU 1100 to another device via the communication network 500.

The CPU 1100 controls, via the input/output interface 1600, an output device, such as a display, a printer, or the like, and controls an input device, such as a keyboard, a mouse, or the like. The CPU 1100 acquires data from an input device via the input/output interface 1600. Furthermore, the CPU 1100 outputs the data created via the input/output interface 1600 to the output device.

The media interface 1700 reads the program or data stored in a recording medium 1800 and provides the read program or data to the CPU 1100 via the RAM 1200. The CPU 1100 loads, the subject program in the RAM 1200 from the recording medium 1800 via the media interface 1700 and executes the loaded program. The recording medium 1800 is, for example, an optical recording medium, such as a digital versatile disc (DVD), a phase change rewritable disk (PD), or the like, a magneto optical recording medium, such as a magneto-optical disk (MO), or the like, a tape medium, a magnetic recording medium, a semiconductor memory, or the like.

For example, when the computer 1000 functions as the providing device 50 according to the embodiment, the CPU 1100 of the computer 1000 implements the function of the control unit 55 by executing the program loaded into the RAM 1200. Furthermore, the HDD 1400 stores therein data stored in the storage unit 52. The CPU 1100 of the computer 1000 reads the program from the recording medium 1800 and executes the program. As another example, the program may also be acquired from other devices via the communication network 500.

9. Others

Of the processes described in the embodiment, the all or a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the registration unit 56 and the detecting unit 57 illustrated in FIG. 6 may also be integrated. Furthermore, for example, the information stored in the storage unit 52 may also be stored in an external storage device via the network N.

Furthermore, the above-described embodiments and modifications may be combined appropriately as long as the processes do not conflict with each other.

10. Effects

As described above, the providing device 50 according to the embodiment includes the detecting unit 57 and the providing unit 59. The detecting unit 57 detects a function, from among functions that are used for communication with an authentication server that authenticates the identity of a user by verifying a signature of authentication result information that is information created by adding the signature using a predetermined private key to an authentication result obtained by an authentication device that performs personal authentication on the user and that is information processed by a specific authentication procedure, that is not held by the user terminal 10 that is used by the user. The providing unit 59 provides the function detected by the detecting unit 57 to the user terminal 10 that is used by the user.

In this way, the providing device 50 according to the embodiment detects a function used for communication with the authentication server 100 and provides the detected function to the user terminal 10. Consequently, the providing device 50 can satisfy, without changing the configuration of the user terminal 10 or the like, the function requested by the authentication server 100 and can allow the authentication process to be performed by providing function that is highly convenient for a user. Namely, the providing device 50 can flexibly respond to the authentication request required from the authentication server 100.

Furthermore, the providing unit 59 provides the function detected by the detecting unit 57 to the user terminal 10 in accordance with the request accepted from the user terminal 10.

Namely, the providing device 50 according to the embodiment can provide the detected function to the user terminal 10 in accordance with the request from the user. Consequently, the user can use, for example, a more convenient external terminal or external function. In this way, the providing device 50 can improve the usability in the authentication process.

Furthermore, the detecting unit 57 detects the function that is used for communication with the authentication server 100 in accordance with the status of the user terminal 10 at the time when communication is requested by the authentication server 100.

Namely, the providing device 50 according to the embodiment provides the function needed by the user terminal 10 on the basis of the status of the user terminal 10. In this way, because the providing device 50 can perform a dynamic process in accordance with the status, the providing device 50 can flexibly respond to the authentication process.

Furthermore, when the user terminal 10 used by the user sends authentication result information to the authentication server, the detecting unit 57 detects the function that is insufficient for the communication with the authentication server 100. The providing unit 59 provides the function associated with the insufficient function detected by the detecting unit 57 to the user terminal 10.

In this way, for example, even if the user terminal 10 is not able to create, by itself, information associated with a specific protocol, the providing device 50 according to the embodiment can create information that can be communicated with the authentication server 100 by providing a predetermined proxy function. In this way, according to the providing device 50, the authentication process can also be performed on the user terminal 10 that is not able to perform, by itself, the authentication process with respect to the authentication server 100.

The detecting unit 57 detects the function that is used to create the authentication result information that satisfies the authentication strength requested by the authentication server 100. The providing unit 59 provides the function to create the authentication result information that satisfies the authentication strength requested by the user terminal 10 side from the authentication server 100.

In this way, the providing device 50 according to the embodiment adjusts, in accordance with the request from the authentication server 100, the function provided to the user terminal 10. Namely, in various kinds of services that need personal authentication, when, for example, services that are in accordance with various kinds of authentication strength are provided, the providing device 50 can provide the function that is used to perform authentication process by using the associated authentication strength.

Furthermore, the providing device 50 according to the embodiment includes the user terminal 10 that is used by a user and the registration unit 56 that registers information related to the user. The detecting unit 57 detects, on the basis of the information registered by the registration unit 56, the function that is used for the communication with the authentication server 100 when the user terminal 10 sends authentication result information to the authentication server 100. The providing unit 59 provides the function detected by the detecting unit 57 to the user terminal 10 side.

In this way, the providing device 50 according to the embodiment previously accepts the registration of the information related to the user terminal 10 or the like. Then, by detecting and providing the function on the basis of the registered information, the providing device 50 can promptly and accurately provide the function needed by the user terminal 10.

Furthermore, the registration unit 56 registers information related to a plurality of terminal devices used by a user or information related to the terminal device that is used by a user trusted by the user. The providing unit 59 uses one of the terminal devices registered by the registration unit 56 and provides the function detected by the detecting unit 57 to the user terminal 10 side.

In this way, the providing device 50 according to the embodiment provides, to the user terminal 10 side from among the pieces of registered information, the function held by the terminals owned by the same user or the terminal owned by a reliable user or the like who has a relationship with a user. Consequently, the user who uses the user terminal 10 can receive an offer of a convenient function. Namely, the providing device 50 can perform the providing process with superb usability.

Furthermore, the registration unit 56 registers the reliability associated with the function that can be used by a user. The providing unit 59 provides, on the basis of the reliability registered by the registration unit 56, the function detected by the detecting unit 57 to the user terminal 10 side.

In this way, the providing device 50 according to the embodiment accepts the registration of the reliability of the authentication device related to the authentication that is performed in the local. Consequently, when the providing device 50 provides the function, the providing device 50 can provide the function of the authentication device with higher reliability and perform adjustment, such as allowing the authentication device to perform authentication with high security.

Furthermore, the providing device 50 according to the embodiment further includes the searching unit 58 that searches for an external device having the function associated with the function detected by the detecting unit 57. By using the external device searched for by the searching unit 58, the providing unit 59 provides the function associated with the function detected by the detecting unit 57 to the user terminal 10 side.

In this way, the providing device 50 according to the embodiment can provide not only the registered information but also the function to the user terminal 10 by the providing device 50 itself searching for an external device. Consequently, because the providing device 50 can extensively procure a function via, for example, a network, the providing device 50 can flexibly respond to the requests for various kinds of authentication processes.

Furthermore, the searching unit 58 searches for, as an external device, one of a terminal device (in the embodiment, the proxy terminal 30) other than the user terminal 10 owned by a user, a terminal device (in the embodiment, the friend terminal 35) owned by a person involved (for example, a family or a friend) in a user, a terminal device (in the embodiment, the shop terminal 40) that is installed in a shop operated by a predetermined business person, and a predetermined server (in the embodiment, the cloud server 45) in the cloud that can be used via a network. The providing unit 59 provides the function held by one of the external devices searched for by the searching unit 58 to the user terminal 10.

In this way, the providing device 50 according to the embodiment searches for, as an example of an external device, a terminal device that is used by another person, a server in the cloud, or the like. Namely, because the providing device 50 can provide the function held by an external device that is easily accessed by a user, the providing device 50 can provide a convenient function for the user.

In the above, the embodiments of the present invention have been described in detail based on the drawings; however, the embodiments are described by way of an example. In addition to the embodiments described in this specification, the present invention may be implemented in other forms in which various modifications and changes are made in accordance with the knowledge of persons skilled in the art.

Furthermore, the "components (sections, modules, units)" described above can be read as "means", "circuits", or the like. For example, the creation unit can be read as a creation means or a creation circuit.

According to an aspect of an embodiment, an advantage is provided in that it is possible to flexibly respond to an authentication request.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A providing device comprising:
a processor programmed to:
detect an authentication function that a terminal device is unable to perform, the authentication function being configured to communicate with an authentication server that authenticates an identity of a user of the terminal device by verifying a signature of authentication result information created by adding the signature using a predetermined key to an authentication result;
detect an authentication device that is configured to perform personal authentication of the user of the terminal device, the personal authentication being performed by the detected authentication device based on a specific authentication procedure using the detected authentication function, which is the authentication function that the terminal device is unable to perform, the detected authentication device being associated with the terminal device by having at least identification information indicating common ownership by the user;
search for an external device that has the detected authentication function or that has a function associated with the detected function, the external device being one of: another terminal device used by the user, a terminal device used by a user associated with the user, a terminal device installed in a shop operated by a predetermined business person, and a predetermined server of a cloud service that can be used via a network;
provide, to the terminal device via the external device determined based on the search, the detected function or the function that is associated with the detected function;
establish a remote connection between the authentication device and the terminal device, and perform the authentication function; and
instruct the terminal device to transmit the authentication result to the authentication server to verify the authentication result in order to authenticate the terminal device.

2. The providing device according to claim 1, wherein the processor is programmed to provide the detected authentication function to the terminal device in accordance with a request accepted from the terminal device.

3. The providing device according to claim 1, wherein the processor is programmed to detect the authentication function that the terminal device is unable to perform, in accordance with a status of the terminal device at a time when communication is requested by the authentication server.

4. The providing device according to claim 1, wherein the processor is programmed to:
detect a function insufficient in the terminal device from among functions needed for communication between the terminal device and the authentication server, and
provide a function associated with the detected insufficient function to the terminal device.

5. The providing device according to claim 1, wherein the processor is programmed to:
detect a function that is used to create the authentication result information that satisfies an authentication strength requested by the authentication server, and
provide, to the terminal device, the function to create the authentication result information that satisfies the authentication strength that is requested by the authentication server with respect to the terminal device.

6. The providing device according to claim 1, wherein the processor is programmed to:
register information related to the terminal device used by the user,
detect the function that the terminal device is unable to perform based on the register information, and
provide the detected function to the terminal device.

7. The providing device according to claim 6, wherein the processor is programmed to:
register information related to a plurality of terminal devices used by the user or information related to a terminal device used by a second user trusted by the user, and provide the detected function to the terminal device by using one of the registered terminal devices.

8. The providing device according to claim 6, wherein the processor is programmed to:
register a reliability associated with a function that can be used by the user, and
provide the detected function to the terminal device based on the registered reliability.

9. A terminal device comprising:
a communication unit that communicates with the providing device according to claim 1; and
a control unit programmed to control transmission of the authentication result information to the authentication server by using the function provided from the providing device via the communication unit.

10. A providing method executed by a computer, the providing method comprising:
detecting an authentication function that a terminal device is unable to perform, the authentication function being configured to communicate with an authentication server that authenticates an identity of a user of the terminal device by verifying a signature of authentication result information created by adding the signature using a predetermined key to an authentication result;
detecting an authentication device that is configured to perform personal authentication of the user of the terminal device, the personal authentication being performed by the detected authentication device based on a specific authentication procedure using the detected authentication function, which is the authentication function that the terminal device is unable to perform, the detected authentication device being associated with the terminal device by having at least identification information indicating common ownership by the user;
searching for an external device that has the detected authentication function or that has a function associated with the detected function, the external device being one of: another terminal device used by the user, a terminal device used by a user associated with the user, a terminal device installed in a shop operated by a predetermined business person, and a predetermined server of a cloud service that can be used via a network;
providing, to the terminal device via the external device determined based on the search, the detected function or the function that is associated with the detected function;
establishing a remote connection between the authentication device and the terminal device, and performing the authentication function; and
instructing the terminal device to transmit the authentication result to the authentication server to verify the authentication result in order to authenticate the terminal device.

11. A non-transitory computer readable storage medium having stored therein a providing program causing a computer to execute a process comprising:
detecting an authentication function that a terminal device is unable to perform, the authentication function being configured to communicate with an authentication server that authenticates an identity of a user of the terminal device by verifying a signature of authentication result information created by adding the signature using a predetermined key to an authentication result;
detecting an authentication device that is configured to perform personal authentication of the user of the terminal device, the personal authentication being performed by the detected authentication device based on a specific authentication procedure using the detected authentication function, which is the authentication function that the terminal device is unable to perform, the detected authentication device being associated with the terminal device by having at least identification information indicating common ownership by the user;
searching for an external device that has the detected authentication function or that has a function associated with the detected function, the external device being one of: another terminal device used by the user, a terminal device used by a user associated with the user, a terminal device installed in a shop operated by a predetermined business person, and a predetermined server of a cloud service that can be used via a network;
providing, to the terminal device via the external device determined based on the search, the detected function or the function that is associated with the detected function;
establishing a remote connection between the authentication device and the terminal device, and performing the authentication function; and
instructing the terminal device to transmit the authentication result to the authentication server to verify the authentication result in order to authenticate the terminal device.

12. An authentication processing system comprising:
a providing device;
a terminal device; and
an authentication server, wherein:
the providing device includes a processor programmed to:
detect an authentication function that a terminal device is unable to perform, the authentication function being configured to communicate with the authentication server that authenticates an identity of a user of the terminal device by verifying a signature of authentication result information created by adding the signature using a predetermined key to an authentication result;
detect an authentication device that is configured to perform personal authentication of the user of the terminal device, the personal authentication being performed by the detected authentication device based on a specific authentication procedure using the detected authentication function, which is the authentication function that the terminal device is unable to perform, the detected authentication device being associated with the terminal device by having at least identification information indicating common ownership by the user;
search for an external device that has the detected authentication function or that has a function associated with the detected function, the external device being one of: another terminal device used by the user, a terminal device used by a user associated with the user, a terminal device installed in a shop operated by a predetermined business person, and a predetermined server of a cloud service that can be used via a network;
provide, to the terminal device via the external device determined based on the search, the detected function or the function that is associated with the detected function;
establish a remote connection between the authentication device and the terminal device, and perform the authentication function; and instruct the terminal device to transmit the authentication result to the authentication server to verify the authentication result in order to authenticate the terminal device, and the terminal device includes:
an authentication control unit configured to control an authentication process on the authentication server by using the function provided by the providing device.

* * * * *